United States Patent
Kalsi et al.

(10) Patent No.: US 10,324,689 B2
(45) Date of Patent: Jun. 18, 2019

(54) SCALABLE MEMORY-OPTIMIZED HARDWARE FOR MATRIX-SOLVE

(71) Applicant: Intel IP Corporation, Santa Clara, CA (US)

(72) Inventors: Gurpreet Singh Kalsi, Bengaluru (IN); Om Ji Omer, Bengaluru (IN); Dipan Kumar Mandal, Bangalore (IN); Santhosh Kumar Rethinagiri, Bengaluru (IN); Gopi Neela, Bengaluru (IN)

(73) Assignee: Intel IP Corporation, Santa Clara, CA (US)

( * ) Notice: Subject to any disclaimer, the term of this patent is extended or adjusted under 35 U.S.C. 154(b) by 18 days.

(21) Appl. No.: 15/819,545

(22) Filed: Nov. 21, 2017

(65) Prior Publication Data

US 2019/0042195 A1    Feb. 7, 2019

(51) Int. Cl.

| | | |
|---|---|---|
| *G06F 7/527* | (2006.01) | |
| *G06F 12/02* | (2006.01) | |
| *G06F 13/16* | (2006.01) | |
| *G06F 13/40* | (2006.01) | |
| *G06F 13/42* | (2006.01) | |
| *G06F 17/12* | (2006.01) | |
| *G06F 9/30* | (2018.01) | |

(52) U.S. Cl.
CPC ........... *G06F 7/527* (2013.01); *G06F 9/3001* (2013.01); *G06F 12/0215* (2013.01); *G06F 13/161* (2013.01); *G06F 13/1673* (2013.01); *G06F 13/4022* (2013.01); *G06F 13/4234* (2013.01); *G06F 17/12* (2013.01); *G06F 2212/654* (2013.01)

(58) Field of Classification Search
USPC ........................................................ 708/607
See application file for complete search history.

(56) References Cited

U.S. PATENT DOCUMENTS

| | | | | |
|---|---|---|---|---|
| 8,626,815 B1 * | 1/2014 | Langhammer | .......... | G06F 17/16 |
| | | | | 708/400 |
| 2008/0279274 A1 * | 11/2008 | Iliev | ...................... | G06F 17/147 |
| | | | | 375/240.2 |
| 2014/0122551 A1 * | 5/2014 | Dogon | .................. | G06F 9/3001 |
| | | | | 708/201 |
| 2018/0189675 A1 * | 7/2018 | Nurvitadhi | .............. | G06F 17/16 |

* cited by examiner

*Primary Examiner* — Tan V Mai

(74) *Attorney, Agent, or Firm* — Schwegman Lundberg & Woessner, P.A.

(57) ABSTRACT

Systems and methods for matrix-solve applications include a memory-optimized hardware acceleration (HWA) solution with scalable architecture (i.e. specialized circuitry) for HWA matrix-solve operations. The matrix-solve solutions described herein may include a scalable hardware architecture with parallel processing (e.g., "within column" processing), which provides the ability to compute several output values in parallel. The HWA matrix-solve solutions described herein may include simultaneous multi-column processing, which provides a lower execution cycle count and a reduced total number of memory accesses. This HWA matrix-solve provides a low latency and energy-efficient matrix-solve solutions, which may be used to reduce energy consumption and improve performance in various matrix-based applications, such as computer vision, SLAM, AR/VR/mixed-reality, machine learning, data analytics, and other matrix-based applications.

25 Claims, 20 Drawing Sheets

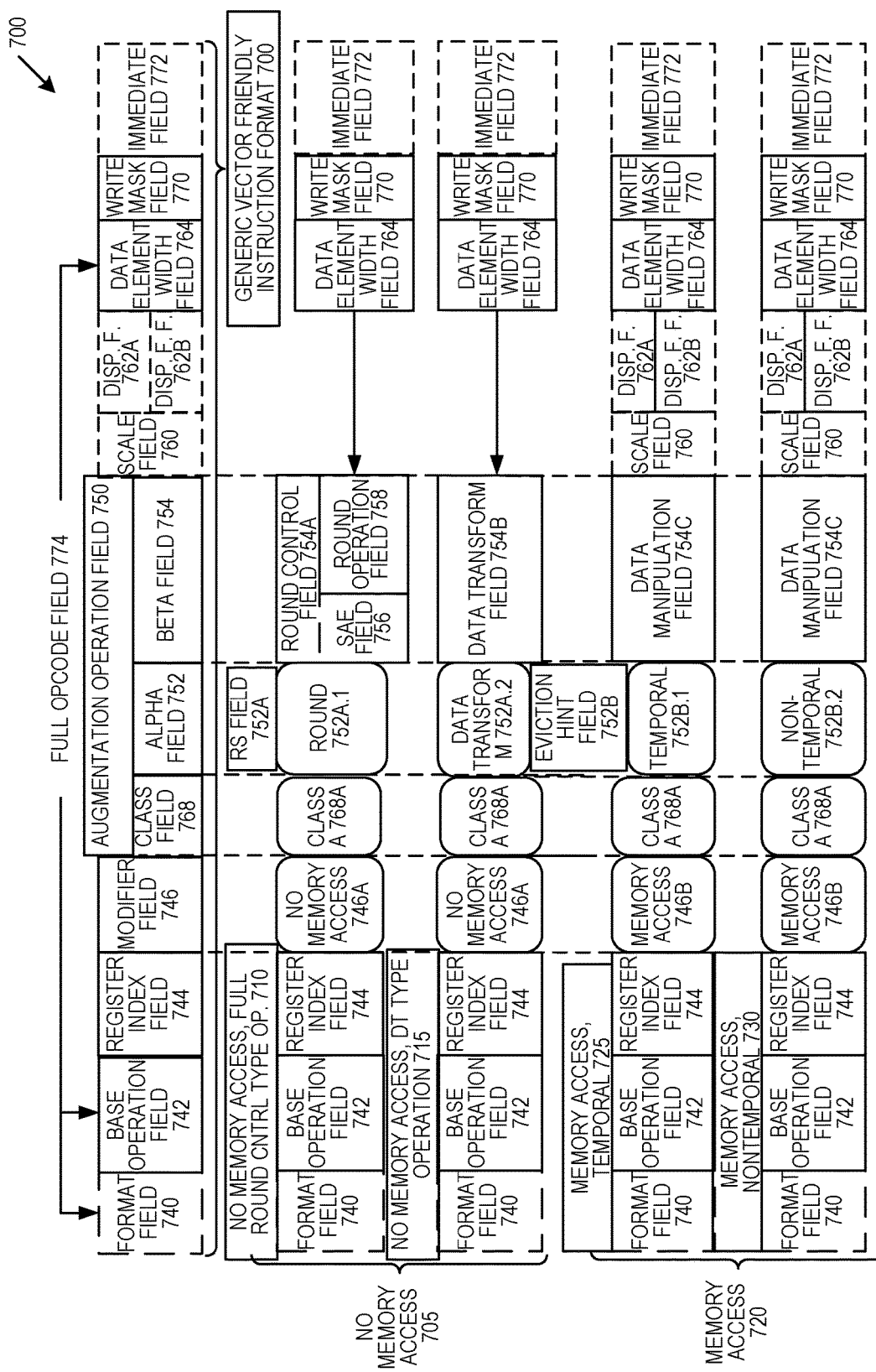

US 10,324,689 B2

SCALABLE MEMORY-OPTIMIZED HARDWARE FOR MATRIX-SOLVE

TECHNICAL FIELD

Embodiments described herein generally relate to computer hardware architecture.

BACKGROUND

Increasingly, there is a demand for solutions to complex linear systems. For example, solving linear system equations may be used to estimate a camera location and angle (e.g., camera pose estimation) or provide vehicular simultaneous localization and mapping (SLAM) calculations, which may be used in augmented reality (AR) or virtual reality (VR) applications. Many applications solve the linear system equations by representing the linear equations as matrices, then solving for a solution matrix (e.g., matrix-solve).

The matrix-solve operations are often performed on a software kernel running on a generic processor, such as a central processing unit (CPU). Matrix-solve operations are computationally intensive. For example, for a matrix K with M rows and N columns (i.e., size M×N), the matrix-solve operations are of complexity $O(M^2N)$. The matrix-solve operations also require substantial memory bandwidth, resulting in a substantial time delay in computing the solution (e.g., large latency). The large latency may significantly affect the performance of various applications, such as slowing camera pose estimation or SLAM calculations. In an embodiment, a matrix-solve operation executed on an ARM (A9 cortex) CPU running at 1.2 GHz using a software kernel optimized for ARM architecture took 1.55 ms to solve for a 128×100 output matrix. In addition to the high latency and large memory bandwidth requirements, matrix-solve operations also require substantial energy to execute the large number of memory accesses. The high latency and high energy consumption may substantially reduce the performance of time-dependent applications, such as AR or VR applications.

BRIEF DESCRIPTION OF THE DRAWINGS

FIGS. 7A-7B are block diagrams illustrating a generic vector friendly instruction format and instruction templates thereof according to an embodiment.

DESCRIPTION OF EMBODIMENTS

Figure 1:
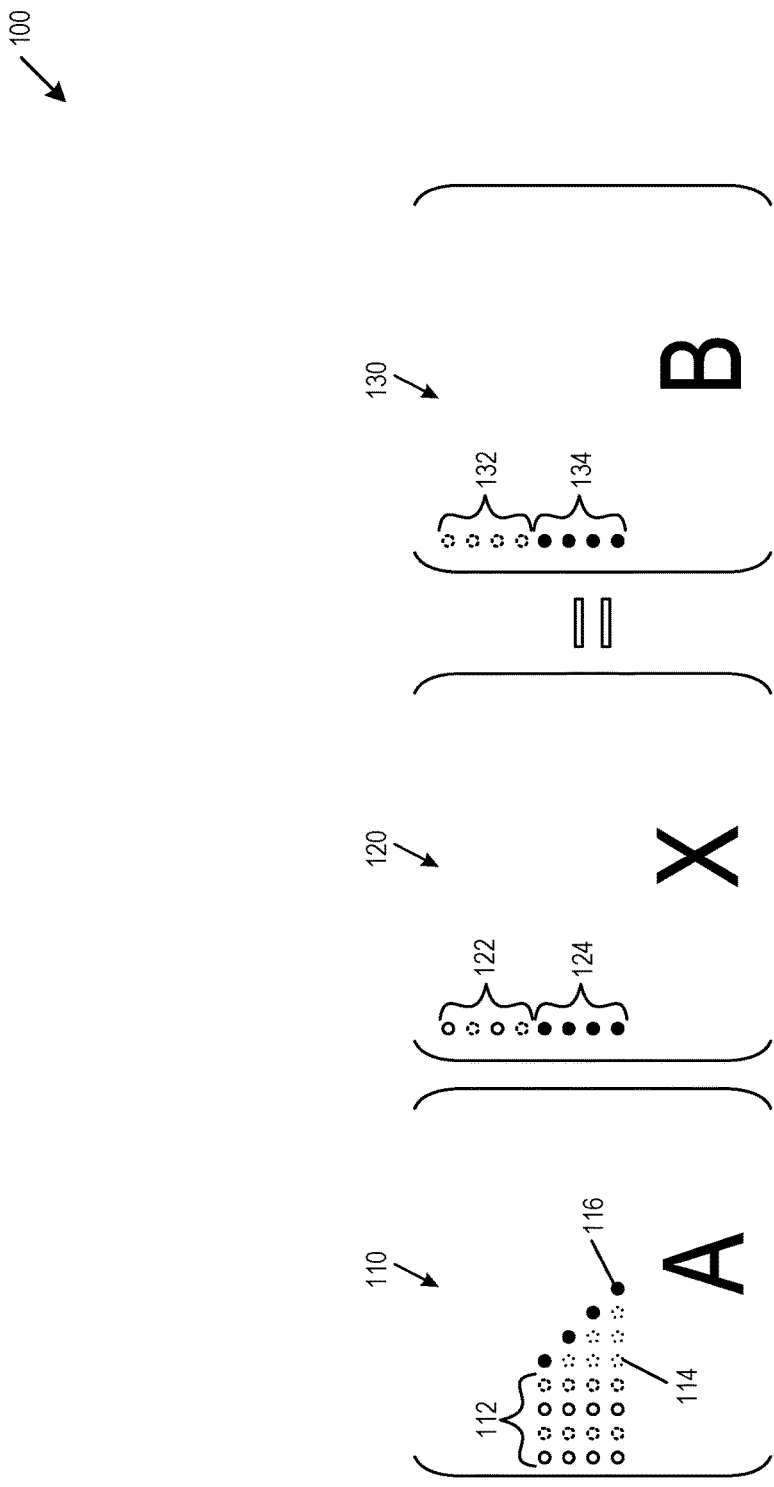
FIG. 1 is a block diagram illustrating a forward substitution HWA matrix-solve stage according to an embodiment.

A solution to the technical problems facing matrix-solve operations executed as a software kernel on a generic processor includes a memory-optimized hardware acceleration (HWA) solution with scalable architecture (e.g., specialized circuitry) for HWA matrix-solve operations. The implementations described herein are applicable for various matrix-solve solutions, including an input matrix that includes any number of columns or rows, any precision of the element values (e.g., half, single, or double precision IEEE 754 floating point numbers), any read-data width, and other matrix variations. The matrix-solve implementations described herein may include a scalable hardware architecture with parallel processing (e.g., "within column" processing), which provides the ability to compute several output values in parallel. The HWA matrix-solve implementations described herein may include simultaneous multi-column processing, which provides a lower execution cycle count and a reduced total number of memory accesses. For example, an n-column simultaneous processing matrix-solve may reduce the total memory accesses by a factor of approximately n-times, and execution is nearly n-times faster execution than that of single column execution.

These HWA matrix-solve solution provides a consistent performance improvement, as shown in Table 1 below:

TABLE 1

| Software Kernel vs. Quad-Column HWA Execution Time | | | |
| --- | --- | --- | --- |
| Matrix Size | SW | Quad-Column HWA | Improvement |
| 60 × 102 | 0.43 ms | 0.04 ms | 11x |
| 128 × 100 | 1.55 ms | 0.13 ms | 12x |
| 154 × 113 | 2.48 ms | 0.21 ms | 12x |

Table 1 above shows a comparison of the execution time between a software (SW) kernel matrix-solve and a quad-column hardware accelerated (HWA) matrix-solve. For an increased matrix size, the quad-column HWA matrix-solve provides a solution that is consistently 11x-12x faster than the software kernel solution. The HWA matrix-solve also greatly reduces memory bandwidth and improves energy efficiency by using smart local buffering control and simultaneous multi-column processing. This HWA matrix-solve provides a low latency and energy-efficient matrix-solve solutions, which may be used to reduce energy consumption and improve performance in various matrix-based applications, such as computer vision, SLAM, AR/VR/mixed-reality, machine learning, data analytics, and other matrix-based applications. The HWA matrix-solve also improves the performance and reduces energy consumption in devices that rely on these matrix-based applications, such as robotics, drones, smartphones, wearable electronics, and other devices running matrix-based applications.

The HWA matrix-solve architecture provides various matrix-specific features. As will be described in greater detail below, the HWA matrix-solve architecture supports forward and backward operations in solving for solution matrix K in the linear matrix equation CK=Y, where C and Y are input matrices, and where matrix C is decomposed into $LL^T$ to yield $LL^TK=Y$. Input matrix C may be decomposed into $LL^T$ using the Cholesky decomposition or another decomposition method. The HWA matrix-solve architecture provides the ability to solve for L as either a lower triangular matrix (forward substitution) or an upper triangular matrix (backward substitution), and can perform this forward or backward substitution in any order. The HWA matrix-solve architecture uses parallel operations within one or more columns while meeting serial dependency of the matrix operations. For example, within a column of output matrix, computation of current element is based on the output of all previous elements within in the same column. In spite of this serial dependency, HWA matrix-solve architecture provides parallel execution within a column.

The HWA matrix-solve architecture provides various configuration advantages. As mentioned above, the HWA matrix-solve provides the ability to execute forward substitution only, backward substitution only, or both forward and backward substitution for full matrix-solve operations. The HWA matrix-solve provides the ability to select and switch between column-major or row-major storage of input matrices. The HWA matrix solve can improve efficiency further by preparing for future operations by performing background multiple-and-accumulate (MAC) operations using the MAC blocks present in the HWA architecture, such as when the host computing device has no new matrix-solve operations to execute.

The HWA matrix-solve architecture provides local selected buffering access control, which also increases energy-efficiency and reduces memory bandwidth requirements. The HWA matrix-solve architecture provides in-place output substitution, where the output of forward substitution is written to same memory location where final output is expected. This same memory space is used as input for backward substitution, where the memory space is used for writing the in-place substitution matrix output values.

The HWA matrix-solve architecture provides substantial energy savings through aggressive data reuse by greatly reducing the memory accesses, especially in multi-column operations of the matrix-solve. The controlled use of local column buffers within the HWA matrix-solve also significantly reduces external memory accesses. Additionally, the HWA matrix-solve architecture achieves further energy savings by using active clock-gating logic to reduce the number of state switches for flip-flops, and by using power-gating to reduce or prevent current from flowing to circuits that are not in use. Overall, the hardware architecture configuration of the HWA matrix-solve provides significant energy savings compared to a matrix-solve software kernel running on generic (i.e., non-configured) processor hardware.

The following description and the drawings illustrate example embodiments, though other embodiments may incorporate structural, logical, electrical, process, and other changes. Portions and features of various embodiments may be included in, or substituted for, those of other embodiments. Embodiments set forth in the claims encompass all available equivalents of those claims.

Figure 2:
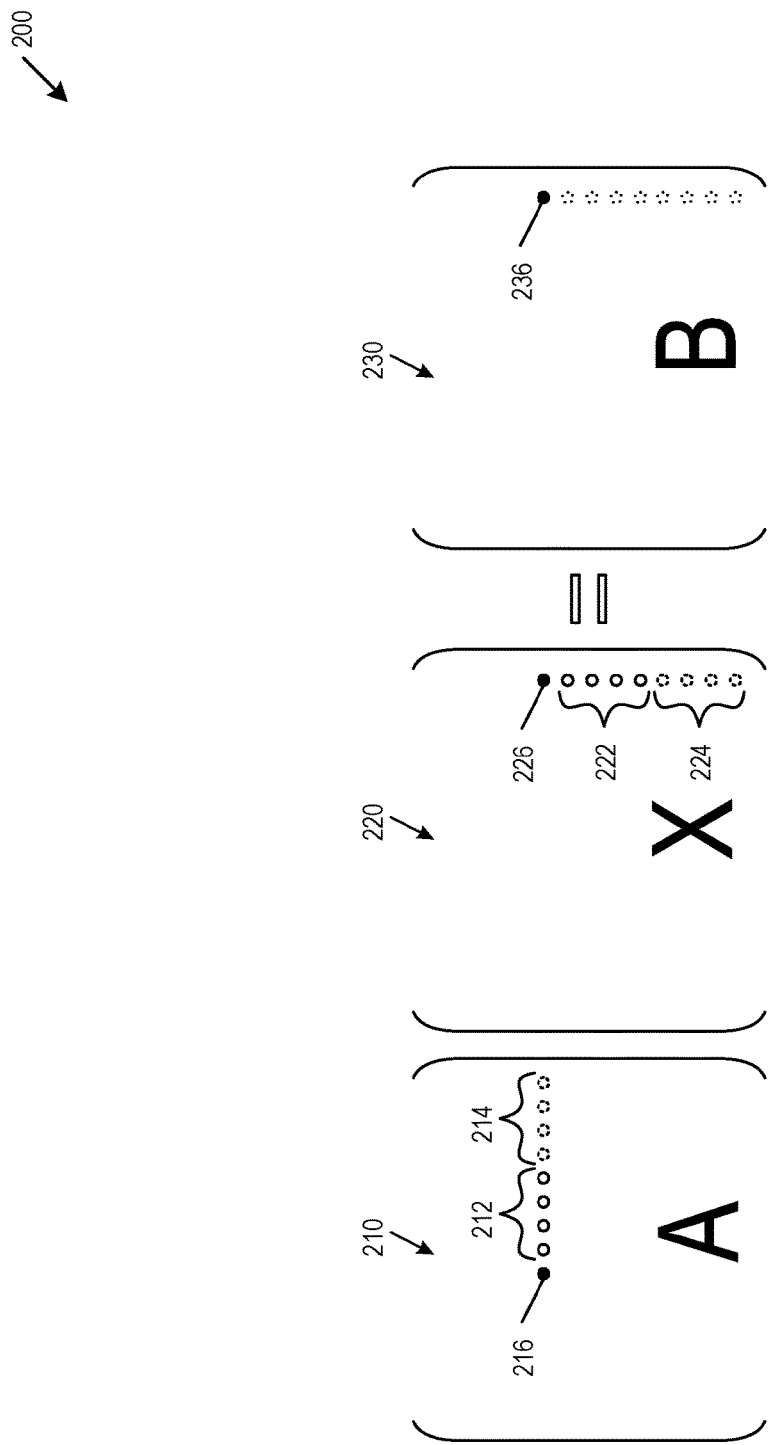
FIG. 2 is a block diagram illustrating a backward substitution HWA matrix-solve stage according to an embodiment.

FIG. 1 is a block diagram illustrating a forward substitution HWA matrix-solve stage 100 according to an embodiment. The HWA matrix-solve solution may be executed as two-step operation: forward substitution such as shown in FIG. 1, and backward substitution such as shown in FIG. 2. The HWA matrix-solve solution described herein provides a hardware-based improved solution for K in the linear equation CK=Y, where C and Y are input matrices. Matrix C may be decomposed into $LL^T$ to yield $LL^TK=Y$, where L is an invertible triangular matrix and $L^T$ is its transpose. By substituting $X_F$ for $L^TK$, the forward substitution operation includes computing $X_F$ using L and Y as $LX_F=Y$. Once $X_F$ is computed, backward substitution is used to find the K in equation $L^TK=X_F$.

One advantage to the HWA matrix-solve solution is that it does not require computing the matrix transposition $L^T$ to compute the forward substitution or the backward substitution. In particular, the HWA matrix-solve solution is able to use the same hardware to execute operations on L by selecting between a forward-substitution memory access pattern and a backward-substitution memory access pattern. This enables the execution of the HWA matrix-solve operations by having either L or $L^T$ in memory, in either row-major or column-major format.

For the discussion herein, L is assumed to be a lower triangular p-row and q-column matrix, where a lower triangular matrix includes a value of 0 for each element above its diagonal (i.e., element $L_{pq}=0$ for each q>p). For this lower triangular matrix L, forward substitution shown in FIG. 1 is performed before backward substitution shown in FIG. 2. However the HWA matrix-solve solution described herein can solve for K irrespective of whether L is lower or upper triangular matrix. For example, when L is an upper triangular matrix, backward substitution shown in FIG. 2 is performed before forward substitution shown in FIG. 1.

As shown in FIG. 1, by substituting AX=B for $LX_F=Y$ in the forward substitution HWA matrix-solve stage 100 enables the computation of matrix X within AX=B, where matrix X 120 is the computed output matrix and matrix A 110 and matrix B 130 are input matrices. Each element $X_{pq}$ in stage 100 may be computed using equation (1) as follows:

$$X_{pq} = \frac{B_{pq} - \sum_{i=0}^{p-1} A_{pi}X_{iq}}{A_{pp}} \quad (1)$$

In equation (1), matrix A 110 corresponds to lower triangular matrix L. Also note that the upper limit of summation is p−1, and is not the number of columns in matrix A 110.

In executing the forward substitution stage 100, various portions of matrix A 110 and matrix B 130 are read into memory to compute each element $X_{pq}$ according to equation (1) above. Stage 100 may be separated into two portions: a set of parallel operations and a serial set of operations.

During the parallel operation, matrix A columns 112 and matrix X elements 122 are pulled into memory with a single memory read operation and used to compute the dot product $\Sigma_{i=0}^{p-1} A_{pi} X_{iq}$. As shown in FIG. 1, four columns 112 are read from matrix A 110, so four dot products are executed in parallel. The number of multiple dot product operations depends on (i) the bit-width of an element and (ii) the data-bus width of the memory ports (e.g., data-bus width based on which matrices are fetched). For example, for a 128-bit width data bus and single-precision floating point numbers (32-bit), 4 dot products may be executed in parallel.

Following the parallel operations, stage 100 includes a set of serial operations. The serial operations are based on the dot product calculated in the parallel operations. If the dot product $\Sigma_{i=0}^{p-1} A_{pi} X_{iq}$ is written as "dot_product$_1$," equation (1) may be rewritten as $X_{pq} = (B_{pq} - (\text{dot\_product}_1))/A_{pp}$. The serial operations are used to compute the matrix X 120 based on matrix A 110 and matrix B 130 according to equation (1) above. For example, matrix X values 124 are calculated based on matrix A triangular elements 114, matrix A diagonal elements 116, and matrix B elements 134.

FIG. 2 is a block diagram illustrating a backward substitution HWA matrix-solve stage 200 according to an embodiment. As described above, stage 100 forward substitution includes computing $X_F$ using L and Y as $LX_F=Y$, however stage 200 backward substitution is used to find the K in equation $L^T K = X_F$. As shown in FIG. 2, the backward substitution stage 200 solves for matrix X 220 in the equation AX=B, where AX=B is substituted for $L^T K = X_F$.

Each element $X_{pq}$ in stage 200 may be computed using equation (2) as follows:

$$X_{pq} = \frac{B_{pq} - \sum_{i=p+1}^{M-1} A_{pi} X_{iq}}{A_{pp}} \quad (2)$$

In stage 200, multiple partial dot products are computed in parallel, where the multiple partial dot products are used to produce each element in matrix X 220. In equation (2), M denotes the number of rows (or columns) in matrix A 210. In stage 200, matrix A 210 represents transposition matrix $L^T$ instead of matrix L, hence all elements below diagonal are zeros (i.e., $A_{pq}=0$ for all q<p).

As shown in FIG. 2, several elements of each row in matrix A 210 are fetched and multiplied with corresponding elements of a column in matrix X 220 to produce a new element in matrix X 220. In the example backward operation step 200 shown in FIG. 2, a first partial dot product is formed by fetching, multiplying, and summing four matrix A elements 212 with matrix X elements 222, and a second partial dot product is formed by fetching, multiplying, and summing four matrix A elements 214 with matrix X elements 224. The first and second partial dot products are summed to calculate the dot product $\Sigma_{i=p+1}^{M-1} A_{pi} X_{iq}$. Subsequently, the dot product is subtracted from matrix B element 236 and divided by matrix A diagonal value 216. If the dot product $\Sigma_{i=p+1}^{M-1} A_{pi} X_{iq}$ is written as "dot_product$_2$," the subsequent operation in equation (2) may be rewritten as $X_{pq} = (B_{pq} - (\text{dot\_product}_2))/A_{pp}$.

Both forward substitution stage 100 and backward substitution stage 200 have similar computational structures. In particular, both stage 100 and stage 200 include the dot product operations dot_product$_1$ and dot_product$_2$, which are multiply-and-accumulate (MAC) operations. Both stage 100 and stage 200 then include the subsequent subtraction and then a division, which shares the general equation $X_{pq} = (B_{pq} - (\text{dot\_product}_{1,2}))/A_{pp}$.

The time required for execution of HWA matrix-solve is substantially affected by the serial dependency of the operations. In particular, the subsequent subtraction and division operations depends on the completion of the dot product operations. However, despite this serial dependency, the HWA matrix-solve architecture computes multiple operations in parallel. One advantage is the ability to compute elements within a given column, referred to herein as "within column" parallelism. Another advantage is the ability to perform simultaneous multi-column processing. These and other advantages are described below.

The HWA matrix-solve operations further improve performance by using a smart matrix element access pattern, such as the column-major access of matrix A 110 in stage 100, and row-major access of matrix A 210 in stage 200. This HWA matrix-solve smart access pattern provides on-the-fly fetching of matrix A 210 by using the same matrix A 210 without requiring $A^T$ in memory (i.e., by using L without requiring $L^T$ in memory). In stage 100, elements of matrix X 120 are computed starting from the top-left corner (e.g., the top element of elements 122), then moving downwards in the column, and then switching to a column that is adjacent on the right. Similarly, in stage 200, the computations start from bottom-right corner of matrix X 220 (e.g., the bottom element of elements 224), then moving upwards in the column, and then switch to a column that is adjacent on the left. Note that in stage 200, the output matrix X 220 is written back to the same memory location as where matrix B 230 is read from (e.g., in-place output substitution), which is described further below with respect to FIG. 3.

Figure 3:
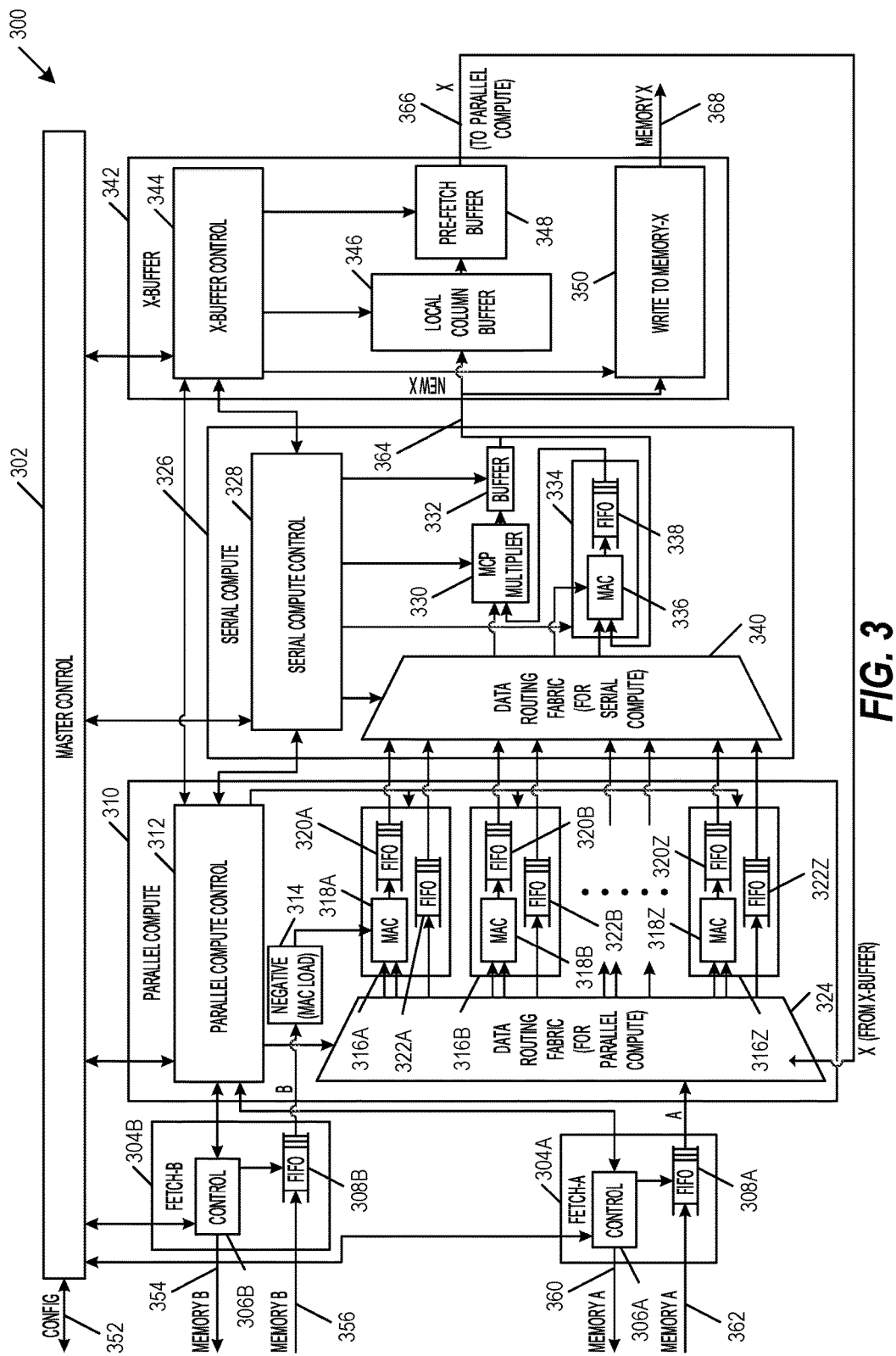
FIG. 3 is a block diagram illustrating a HWA matrix-solve architecture according to an embodiment.

FIG. 3 is a block diagram illustrating a HWA matrix-solve architecture 300 according to an embodiment. In a full matrix-solve operation, the HWA matrix-solve architecture 300 is used to execute the column-by-column operations of matrix X 120 in stage 100, then switches to stage 200 for a column-by-column computation of the final output. In stage 200, the input matrix B 230 is read from and output matrix X 220 is written to the same memory. This in-place output substitution reduces or prevents the need for additional memory space, thereby improving efficient use of memory space.

Architecture 300 includes a master control block 302. The master control block 302 reads a configuration command 352 issued by the host device, then initializes the matrix-solve operation based on a start pulse received from the host device. The master control block 302 also sends, receives, and manages signals to and from other hardware components, including "start" signals and "done" signals to control the matrix-solve operation. When the matrix-solve operation is complete, the master control block 302 sends a "done" signal back to the host device.

Architecture 300 includes a fetch-A block 304A, which is used to fetch data from the matrix-A memory. In the fetch operation, fetch-A block 304A includes a control block 306A (e.g., memory address register) that sends a requested address to memory A via signal line 360, receives the memory contents via signal line 362, and stores the incoming data in first-in-first-out (FIFO) buffer 308A (e.g., memory data register buffer). The FIFO 308A may not be large enough to store all of the data of matrix A, so multiple fetch operations may be used, and FIFO 308A may act as a buffer to receive portions of matrix A and provide them to a subsequent computing block. The fetching process is initiated after receiving a "start" signal from master control 302. When fetch-A block 304A has completed fetching all the data of matrix A (e.g., no outstanding requests), and when FIFO 308A is empty, the fetch-A block 304A will send a "done" signal to the master control 302. Fetch-A block 304A iterates for N number of times per stage, where N is the number of columns in output matrix X. This n-column simultaneous processing matrix-solve solution reduces fetch-A block 304A accesses by n times, which nearly reduces the overall number of memory accesses by n-times.

Architecture 300 includes a fetch-B block 304B, which is used to fetch data from the matrix-B memory. The fetch-B block 304B functions similar to the fetch-A block 304A, including a control block 306B that sends a requested address to memory B, receives the memory contents, and stores the incoming data in FIFO 308B. Unlike the fetch-A block 304A, the fetch-B block 304B fetches the entire B matrix only once per stage.

Architecture 300 includes a within-column parallel compute block 310, which computes the parallel portions of matrix-solve operations in both stage 100 and stage 200. The parallel compute block 310 reads data from fetch-A FIFO 308A as long as FIFO 308A is not empty and corresponding matrix X values are available, where the X-buffer 342 indicates the matrix X value availability. The parallel dot products are executed using Z different MAC modules 318A, 318B, ..., 318Z, whose dot product is stored in respective output FIFO buffers 320A, 320B, ..., 320Z before moving the data to serial compute block 326. The number of different MAC modules may be based on a ratio of the read data width to element width, such as Z=read_data_width/element width. For example, a 128-bit memory read where values are represented using single precision (i.e., 32 bits), can be processed using 128/32=4 MAC modules. Separate FIFO buffers 322A, 322B, ..., 322Z are used to receive and provide FIG. 1 elements 114, elements 116, elements 124, and elements 134. The values from these FIFO buffers 322A, 322B, ..., 322Z are used to store the most recent few elements of the rows (including the diagonal element) in a first-in-first-out (FIFO) configuration, and provide the next value (i.e., FIFO buffer "pop") in response to a signal from the serial compute block 326. The parallel compute block 310 begins processing in response to receiving a "start" signal from the master control block 302, and upon completing the execution of one column of matrix X, sends a "done" signal back to the master control block 302 to indicate that the parallel compute block 310 has completed its operations.

One advantage of HWA matrix-solve architecture 300 is preloading a negative B, which provides the negative value of $B_{pq}$ in equation (1) and equation (2). In particular, fetch-B 304B provides the B value to a negative MAC 314, which negates B by inverting the sign bit, and provides the negated B value to MAC 318A. This hardware configuration removes the subtract operation from the serial dependency critical path of serial compute block 326. Another advantage of HWA matrix-solve architecture 300 is the determination of the inverse of the diagonal element based on the decomposition of matrix C into LLT, specifically by using the inverse of $A_{pp}$ computed during the matrix decomposition (e.g., during a Cholesky decomposition).

This use of the previously determined inverse avoids the re-computation of the inverse, thus removing this re-computation from the serial dependency critical path. In particular, the serial compute block 326 multiplies the ($B_{pq}$-(dot-product$_1$)) by $1/A_{pp}$ instead of using a computationally expensive division operation ($B_{pq}$-(dot-product$_1$))/$A_{pp}$.

Even if the HWA matrix-solve architecture 300 is implemented to take an input of L or $L^T$ without computing the inverse of $A_{pp}$ via the matrix decomposition, an inverse block (not shown) could be added after FIFO buffers 322A, 322B, ..., 322Z, and writing the output of inverse to an additional output FIFO (not shown), which would interact with serial compute block 326. In either embodiment, the division operation in critical path is reduced to a less computationally expensive multiplication operation.

Architecture 300 includes a serial compute block 326. In stage 100, this serial compute block 326 computes new element of matrix X for each row using the dot product produced in the parallel compute block 310 and executing the additional dot product using the previously computed new element of matrix X. Because of the inputs used in these calculations, there is a serial dependency on having those inputs previously computed. In stage 200, the serial compute MAC 336 accumulates the partial dot products provided by the parallel compute block 310. Due to the serial dependency, a multi-cycle-path (MCP) multiplier 330 is used instead of pipelined multiplier. The output of the MCP multiplier 330 is negated by a negation block (not shown) before sending to X-buffer block 342. The serial compute block 326 begins processing in response to receiving a "start" signal from the master control block 302, and upon completing the execution of one column of matrix X, sends a "done" signal back to the master control block 302 to indicate that the serial compute block 326 has completed its operations.

Architecture 300 includes an X-buffer block 342. The X-buffer block 342 handles the logic related to: (i) storing new elements of matrix X computed by serial compute block 326 in a local column (e.g., SRAM) buffer 346, (ii) providing matrix X input to parallel compute block 310 (e.g., using pre-fetch logic), and (iii) writing output to matrix X memory 350. The X-buffer block 342 includes a pre-fetch buffer 348 to leverage the predictability of the data calls, thereby further improving the performance. The architecture and logic within the X-buffer block 342 reduces or eliminates a significant number of accesses to external memory, such as would otherwise be used to repeatedly access elements of matrix X. The X-buffer block 342 begins processing in response to receiving a "start" signal from the master control block 302, and upon completing the execution of one column of matrix X, sends a "done" signal back to the master control block 302 to indicate that the X-buffer block 342 has completed its operations.

Figure 4:
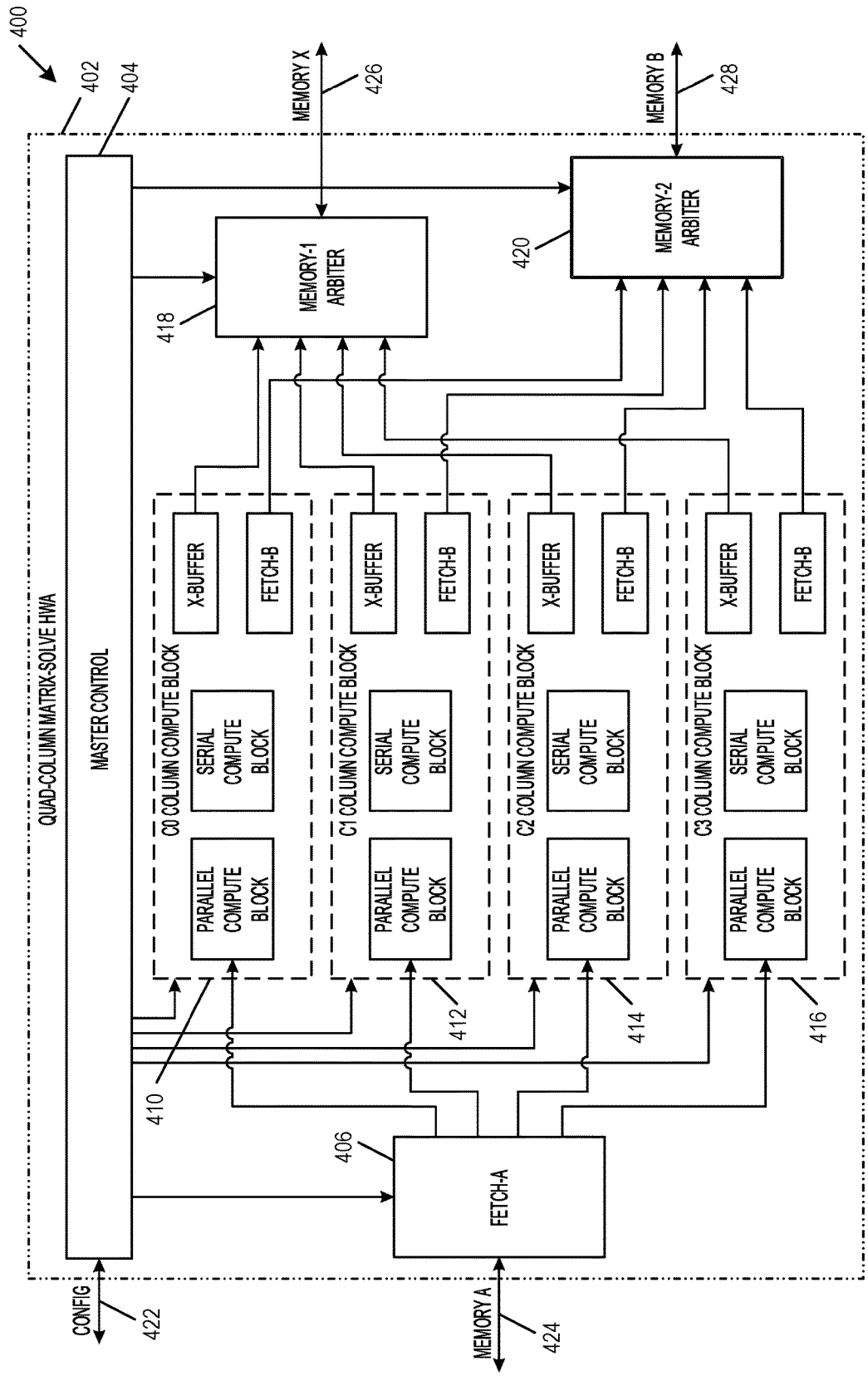
FIG. 4 is a block diagram illustrating a HWA matrix-solve quad-column architecture according to an embodiment.

FIG. 4 is a block diagram illustrating a HWA matrix-solve quad-column architecture 400 according to an embodiment. The modularity of this HWA matrix-solve architecture 300 provides an efficient scaling of the design for simultaneous multi-column processing, such as the quad-column architecture 400. The quad-column architecture 400 provides four column computing blocks 410, 412, 414, and 416 that operate simultaneously. Each column computing block includes the components from architecture 300 needed to process a matrix column, including a within-column parallel computing block, a serial computing block, an X-buffer block, and a fetch-B block. The quad-column architecture 400 provides for simultaneous processing of 4 columns, however this may be extended or reduced as needed to provide simultaneous n-column processing by iterating these modules for N/n times and have n column computing blocks.

One feature that enables this scaling is that there is no need for exchange of control information (e.g., row or column traversal counts) between or among various computing blocks. Each computing block performs a selected computation and writes its output data to a FIFO, and that data is subsequently consumed by the computing blocks. Each computing block receives a "start" signal from master control block 404, and sends a "done" signal back to the master control block 404 when the data has been written to the respective FIFO. Except for fetch-B, all other modules iterate N number of times, where N is the number of columns of output matrix X. For a quad column HWA matrix-solve where n=4, the other modules iterate N/n times.

To provide simultaneous multi-column processing within quad-column architecture 400, the fetch-A block 406 is modified to include synchronization logic that retrieves (i.e., "pops") an entry from a FIFO only when all the column compute blocks 410, 412, 414, and 416 consume that entry. Additionally, because no additional memory ports are used in extending architecture 300 to quad-column architecture 400, two arbiter modules (e.g., memory-1 arbiter 418 and memory-2 arbiter 420) are added to arbitrate the memory access requests from various column compute blocks 410, 412, 414, and 416.

The master control block 404 ensures each column compute block computes its share of N/n columns. In the embodiment shown in quad-column architecture 400, the C0 column compute block 410 computes columns 0 to (N/4)−1, and C1 block 412 computes N/4 to 2(N/4)−1, and so on. This provides improved processing over an alternative method of multiplexing (e.g., interleaving) the columns across column compute blocks, such as computing the 0th column in the C0 block 410, $1^{st}$ column in the C1 block 412, and so on. This quad-column architecture 400 computation of columns 0 to (N/n)−1 in the C0 column compute block 410 (and so on) provides n-column simultaneous processing while avoiding the need to redesign blocks such as fetch-A 408, each within-column parallel compute block, and other computation blocks for simultaneous processing.

Figure 5:
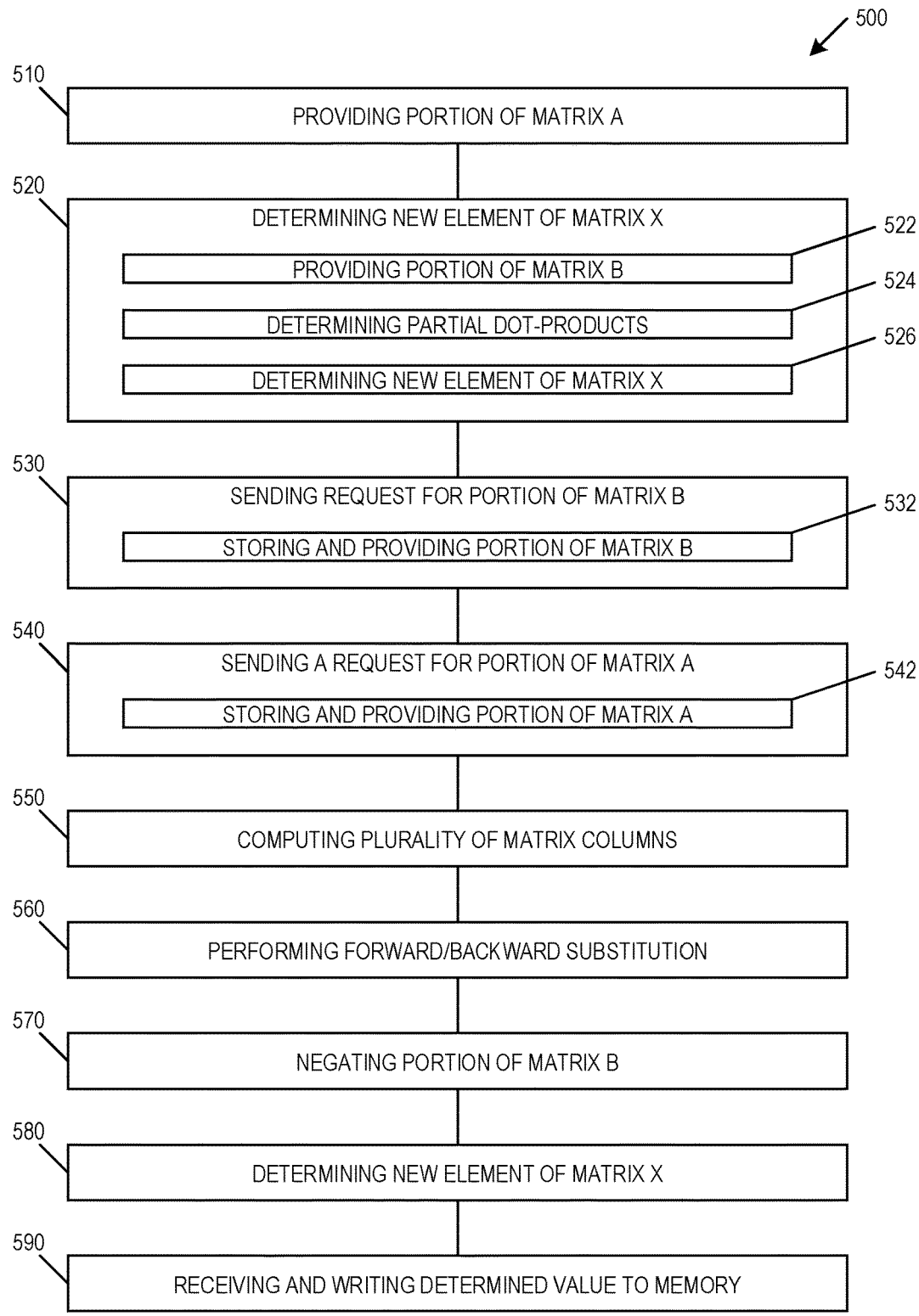
FIG. 5 is a block diagram of a HWA matrix-solve method, in accordance with at least one embodiment.

FIG. 5 is a block diagram of a matrix-solve method 500, in accordance with at least one embodiment. Method 500 includes providing a portion of a matrix A 510 at a fetch-A block to a matrix column computation block. Method 500 includes determining a new element of matrix X 520 at the matrix column computation block. Determining the new element of matrix X 520 may include providing a portion of a matrix B 522 at a fetch-B block within the matrix column computation block. Determining the new element of matrix X 520 may also include determining a plurality of partial dot products 524 at a parallel compute block within the matrix column computation block. The plurality of partial dot products may be determined based on elements of matrix B and elements of a matrix X. Determining the new element of matrix X 520 may also include determining the new element of matrix X at a serial compute block 526 within the matrix column computation block, where the new element of matrix X is determined based on the plurality of partial dot products.

Method 500 includes sending a memory address request for the portion of matrix B 530 from a fetch-B memory address register within the fetch-B block. Method 500 includes storing and providing the portion of matrix B 532 at a fetch-B memory data register first-in-first-out (FIFO) buffer within the fetch-B block. Method 500 includes sending a memory address request for the portion of matrix A 540 from a fetch-A memory address register within the fetch-A block. Method 500 includes storing and providing the portion of matrix A 542 at a fetch-A memory data register FIFO buffer within the fetch-A block.

Method 500 includes computing a plurality of matrix columns 550 within a plurality of column compute blocks, each of the plurality of column compute blocks including a matrix column computation block. Method 500 includes determining the value of the matrix X based on determining at least one of a forward substitution value and a backward substitution value 560. Method 500 includes negating the portion of the matrix B 570 at a negative multiply-and-accumulate (MAC) block within the parallel compute block. Method 500 includes determining the new element of matrix X 580 based on the plurality of partial dot products received at a serial MAC within the serial compute block. Method 500 includes receiving and writing 590 the determined value of the matrix X to a memory, where the value of the matrix X is received at an X-buffer block within the matrix column computation block.

Figure 6:
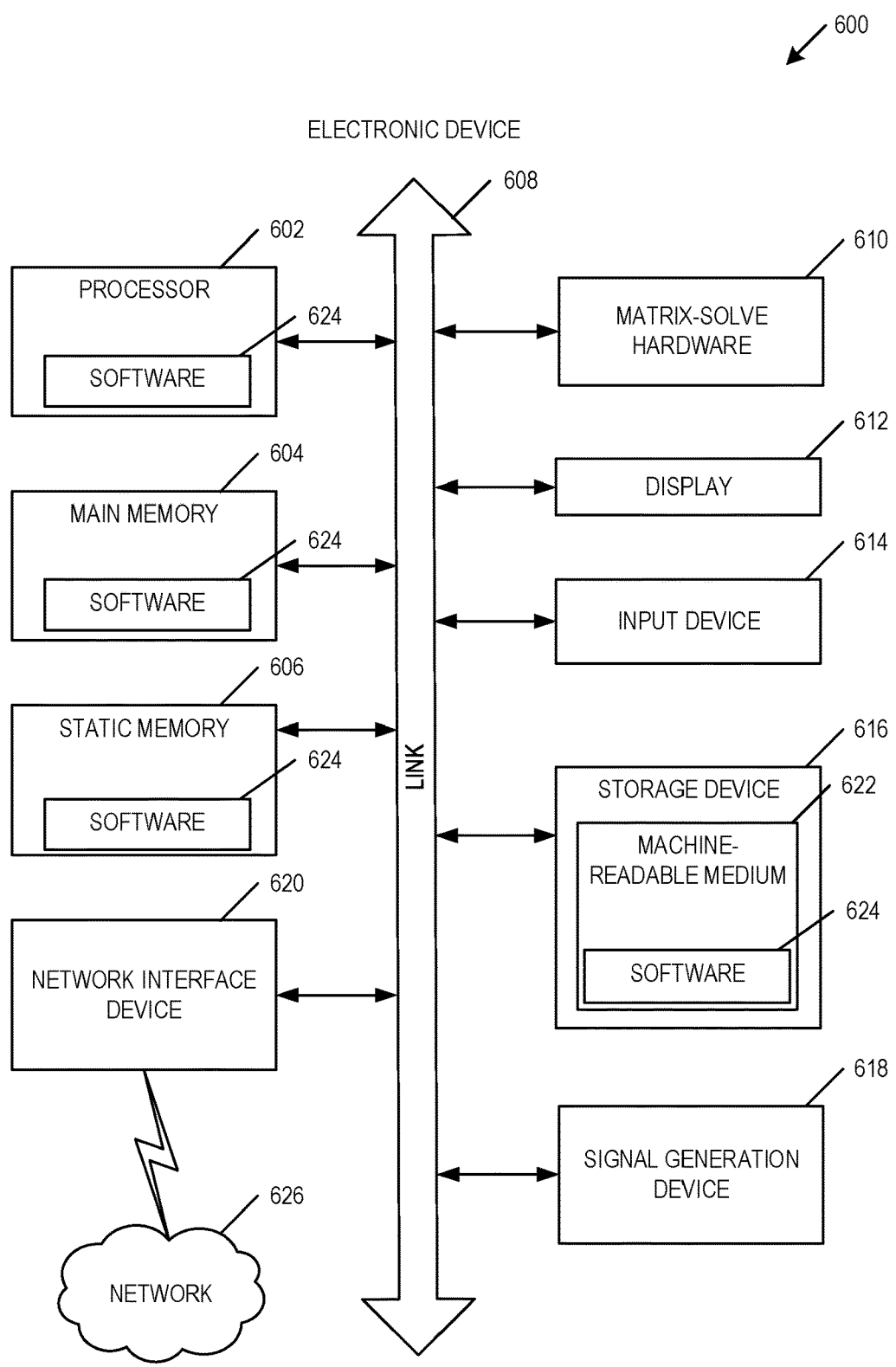
FIG. 6 is a block diagram illustrating a HWA matrix-solve system in the example form of an electronic device, according to an example embodiment.

FIG. 6 is a block diagram illustrating a HWA matrix-solve system in the example form of an electronic device 600, within which a set or sequence of instructions may be executed to cause the machine to perform any one of the methodologies discussed herein, according to an example embodiment. Electronic device 600 may also represent the devices shown in FIGS. 3-4. In alternative embodiments, the electronic device 600 operates as a standalone device or may be connected (e.g., networked) to other machines. In a networked deployment, the electronic device 600 may operate in the capacity of either a server or a client machine in server-client network environments, or it may act as a peer machine in peer-to-peer (or distributed) network environments. The electronic device 600 may be an integrated circuit (IC), a portable electronic device, a personal computer (PC), a tablet PC, a hybrid tablet, a personal digital assistant (PDA), a mobile telephone, or any electronic device 600 capable of executing instructions (sequential or otherwise) that specify actions to be taken by that machine to detect a user input. Further, while only a single electronic device 600 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus).

The electronic device 600 includes matrix-solve hardware 610, where the matrix-solve hardware 610 may include the components described above in FIG. 3-4. The electronic device 600 may further include a display unit 612, where the display unit 612 may include a single component that provides a user-readable display and a protective layer, or another display type. The electronic device 600 may further include an input device 614, such as a pushbutton, a keyboard, an NFC card reader, or a user interface (UI) navigation device (e.g., a touch-sensitive input). The electronic device 600 may additionally include a storage device 616, such as a solid-state drive (SSD) unit. The electronic device 600 may additionally include a signal generation device 618 to provide audible or visual feedback, such as a speaker to provide an audible feedback or one or more LEDs to provide a visual feedback. The electronic device 600 may additionally include a network interface device 620, and one or more additional sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the electronic device 600. The main memory 604, static memory 606, and the processor 602 may also constitute machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

The figures below detail example architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 7B:
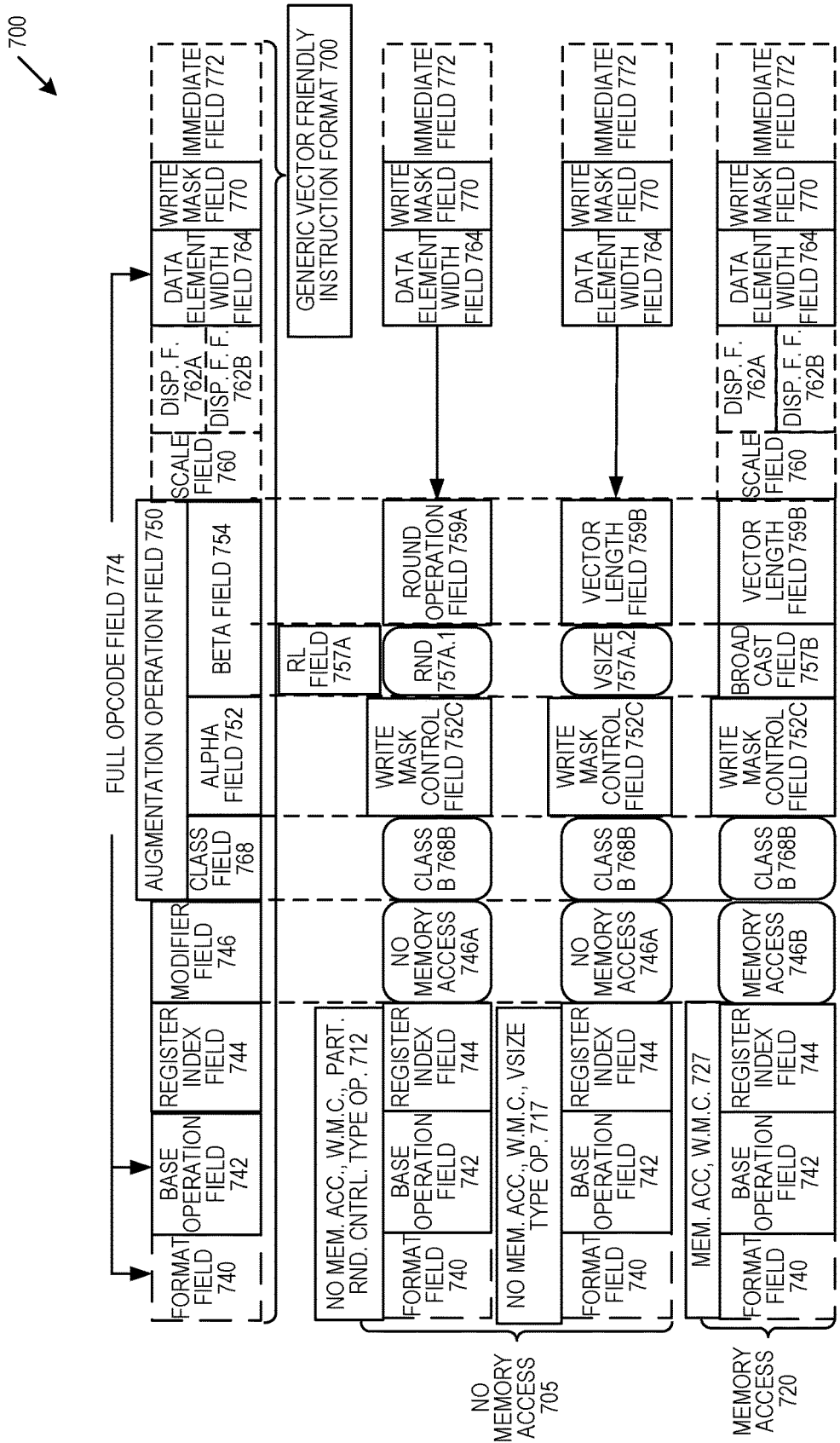

FIGS. 7A-7B are block diagrams illustrating a generic vector friendly instruction format and instruction templates thereof according to an embodiment. FIG. 7A is a block diagram illustrating a generic vector friendly instruction format and class A instruction templates thereof according to embodiments of the invention; while FIG. 7B is a block diagram illustrating the generic vector friendly instruction format and class B instruction templates thereof according to an embodiment. Specifically, a generic vector friendly instruction format 700 for which are defined class A and class B instruction templates, both of which include no memory access 705 instruction templates and memory access 720 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 7A include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, non-temporal 730 instruction template. The class B instruction templates in FIG. 7B include: 1) within the no memory access 705 instruction templates there is shown a no memory access, write mask control, partial round control type operation 712 instruction template and a no memory access, write mask control, VSIZE type operation 717 instruction template; and 2) within the memory access 720 instruction templates there is shown a memory access, write mask control 727 instruction template.

The generic vector friendly instruction format 700 includes the following fields listed below in the order illustrated in FIGS. 7A-7B.

Format field 740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 742—its content distinguishes different base operations.

Register index field 744—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 746—its content distinguishes occurrences of instructions in the generic vector instruction format that specify memory access from those that do not; that is, between no memory access 705 instruction templates and memory access 720 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 750—its content distinguishes which one of a variety of different operations to be performed in addition to the base operation. This field is context specific. In one embodiment of the invention, this field is divided into a class field 768, an alpha field 752, and a beta field 754. The augmentation operation field 750 allows common groups of operations to be performed in a single instruction rather than 2, 3, or 4 instructions.

Scale field 760—its content allows for the scaling of the index field's content for memory address generation (e.g., for address generation that uses $2^{scale}*\text{index}+\text{base}$).

Displacement Field 762A—its content is used as part of memory address generation (e.g., for address generation that uses $2^{scale}*\text{index}+\text{base}+\text{displacement}$).

Displacement Factor Field 762B (note that the juxtaposition of displacement field 762A directly over displacement factor field 762B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different embodiments may implement only one or none of the two.

Data element width field 764—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While embodiments of the invention are described in which the write mask field's 770 content selects one of a number of write mask registers that contains the write mask to be used (and thus the write mask field's 770 content indirectly identifies that masking to be performed), alternative embodiments instead or additional allow the mask write field's 770 content to directly specify the masking to be performed.

Immediate field 772—its content allows for the specification of an immediate. This field is optional in the sense that is it not present in an implementation of the generic vector friendly format that does not support immediate and it is not present in instructions that do not use an immediate.

Class field 768—its content distinguishes between different classes of instructions. With reference to FIGS. 7A-B, the contents of this field select between class A and class B instructions. In FIGS. 7A-B, rounded corner squares are used to indicate a specific value is present in a field (e.g., class A 768A and class B 768B for the class field 768 respectively in FIGS. 7A-B).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed. In the no memory access 705 instruction templates, the scale field 760, the displacement field 762A, and the displacement scale filed 762B are not present.

No-Memory Access Instruction Templates—Full Round Control Type Operation

In the no memory access full round control type operation 710 instruction template, the beta field 754 is interpreted as a round control field 754A, whose content(s) provide static rounding. While in the described embodiments of the invention the round control field 754A includes a suppress all floating point exceptions (SAE) field 756 and a round operation control field 758, alternative embodiments may support may encode both these concepts into the same field or only have one or the other of these concepts/fields (e.g., may have only the round operation control field 758).

SAE field 756—its content distinguishes whether or not to disable the exception event reporting; when the SAE field's 756 content indicates suppression is enabled, a given instruction does not report any kind of floating-point exception flag and does not raise any floating point exception handler.

Round operation control field 758—its content distinguishes which one of a group of rounding operations to perform (e.g., Round-up, Round-down, Round-towards-zero and Round-to-nearest). Thus, the round operation control field 758 allows for the changing of the rounding mode on a per instruction basis. In one embodiment of the invention where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7A, temporal 752B.1 and non-temporal 752B.2 are respectively specified for the memory access, temporal 725 instruction template and the memory access, non-temporal 730 instruction template), while the beta field 754 is interpreted as a data manipulation field 754C, whose content distinguishes which one of a number of data manipulation operations (also known as primitives) is to be performed (e.g., no manipulation; broadcast; up conversion of a source; and down conversion of a destination). The memory access 720 instruction templates include the scale field 760, and optionally the displacement field 762A or the displacement scale field 762B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement scale filed 762B are not present.

In the no memory access, write mask control, partial round control type operation 710 instruction template, the rest of the beta field 754 is interpreted as a round operation field 759A and exception event reporting is disabled (a given instruction does not report any kind of floating-point exception flag and does not raise any floating point exception handler).

Round operation control field 759A—just as round operation control field 758, its content distinguishes which one of a group of rounding operations to perform (e.g., Round-up, Round-down, Round-towards-zero and Round-to-nearest). Thus, the round operation control field 759A allows for the changing of the rounding mode on a per instruction basis. In one embodiment of the invention where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted the vector length field 759B. The memory access 720 instruction templates include the scale field 760, and optionally the displacement field 762A or the displacement scale field 762B.

With regard to the generic vector friendly instruction format 700, a full opcode field 774 is shown including the format field 740, the base operation field 742, and the data element width field 764. While one embodiment is shown where the full opcode field 774 includes all of these fields, the full opcode field 774 includes less than all of these fields in embodiments that do not support all of them. The full opcode field 774 provides the operation code (opcode).

The augmentation operation field 750, the data element width field 764, and the write mask field 770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Example Specific Vector Friendly Instruction Format

FIG. 8 is a block diagram illustrating an example specific vector friendly instruction format according to an embodiment. FIG. 8 shows a specific vector friendly instruction format 800 that is specific in the sense that it specifies the location, size, interpretation, and order of the fields, as well as values for some of those fields. The specific vector friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 7 into which the fields from FIG. 8 map are illustrated.

It should be understood that, although embodiments of the invention are described with reference to the specific vector friendly instruction format 800 in the context of the generic vector friendly instruction format 700 for illustrative purposes, the invention is not limited to the specific vector friendly instruction format 800 except where claimed. For example, the generic vector friendly instruction format 700 contemplates a variety of possible sizes for the various fields, while the specific vector friendly instruction format 800 is shown as having fields of specific sizes. By way of specific example, while the data element width field 764 is illustrated as a one bit field in the specific vector friendly instruction format 800, the invention is not so limited (that is, the generic vector friendly instruction format 700 contemplates other sizes of the data element width field 764).

Figure 8A:
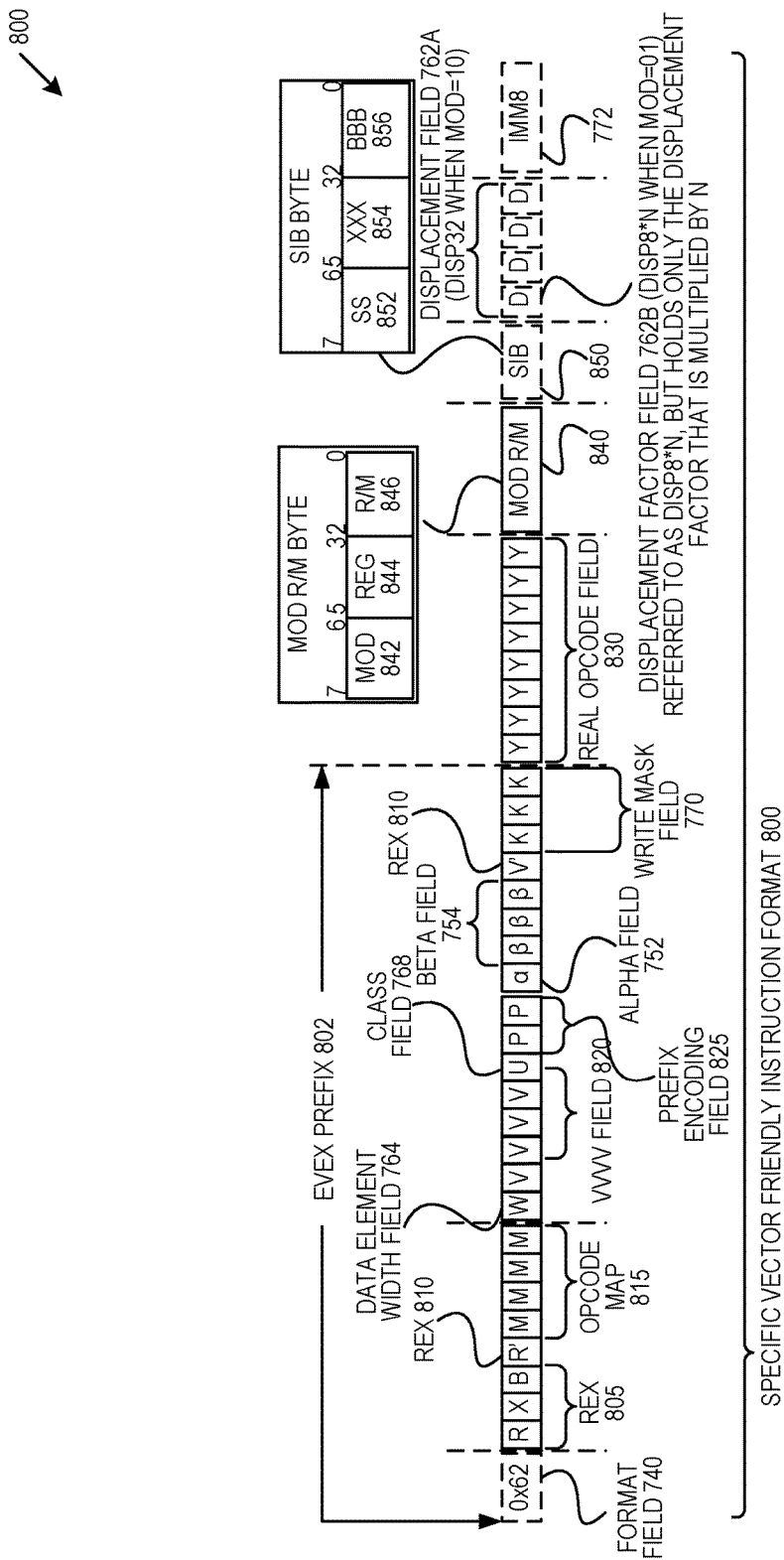
FIG. 8A-8D are block diagrams illustrating an example specific vector friendly instruction format according to an embodiment.

The generic vector friendly instruction format 700 includes the following fields listed below in the order illustrated in FIG. 8A.

EVEX Prefix (Bytes 0-3) 802—is encoded in a four-byte form.

Format Field 740 (EVEX Byte 0, bits [7:0])—the first byte (EVEX Byte 0) is the format field 740 and it contains 0x62 (the unique value used for distinguishing the vector friendly instruction format in one embodiment of the invention).

The second-fourth bytes (EVEX Bytes 1-3) include a number of bit fields providing specific capability.

REX field 805 (EVEX Byte 1, bits [7-5])—consists of a EVEX.R bit field (EVEX Byte 1, bit [7]-R), EVEX.X bit field (EVEX byte 1, bit [6]-X), and 757BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710—this is the first part of the REX' field 710 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 815 (EVEX byte 1, bits [3:0]-mmmm)—its content encodes an implied leading opcode byte (0F, 0F 38, or 0F 3).

Data element width field 764 (EVEX byte 2, bit [7]-W)—is represented by the notation EVEX.W. EVEX.W is used to define the granularity (size) of the datatype (either 32-bit data elements or 64-bit data elements).

EVEX.vvvv 820 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 820 encodes the 4 low-order bits of the first source register specifier stored in inverted (1s complement) form. Depending on the instruction, an extra different EVEX bit field is used to extend the specifier size to 32 registers.

EVEX.U 768 Class field (EVEX byte 2, bit [2]-U)—If EVEX.U=0, it indicates class A or EVEX.U0; if EVEX.U=1, it indicates class B or EVEX.U1.

Prefix encoding field 825 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 752 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 754 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 710—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand, or be treated as an opcode extension and not used to encode any instruction operand. The role of RIM field 846 may include the following: encoding the instruction operand that references a memory address, or encoding either the destination register operand or a source register operand.

Scale, Index, Base (SIB) Byte (Byte 6)—As previously described, the scale field's 750 content is used for memory address generation. SIB.xxx 854 and SIB.bbb 856—the contents of these fields have been previously referred to with regard to the register indexes Xxxx and Bbbb.

Displacement field 762A (Bytes 7-10)—when MOD field 842 contains 10, bytes 7-10 are the displacement field 762A, and it works the same as the legacy 32-bit displacement (disp32) and works at byte granularity.

Displacement factor field 762B (Byte 7)—when MOD field 842 contains 01, byte 7 is the displacement factor field 762B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 762B is a reinterpretation of disp8; when using displacement factor field 762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 772 operates as previously described.

Full Opcode Field

Figure 8B:
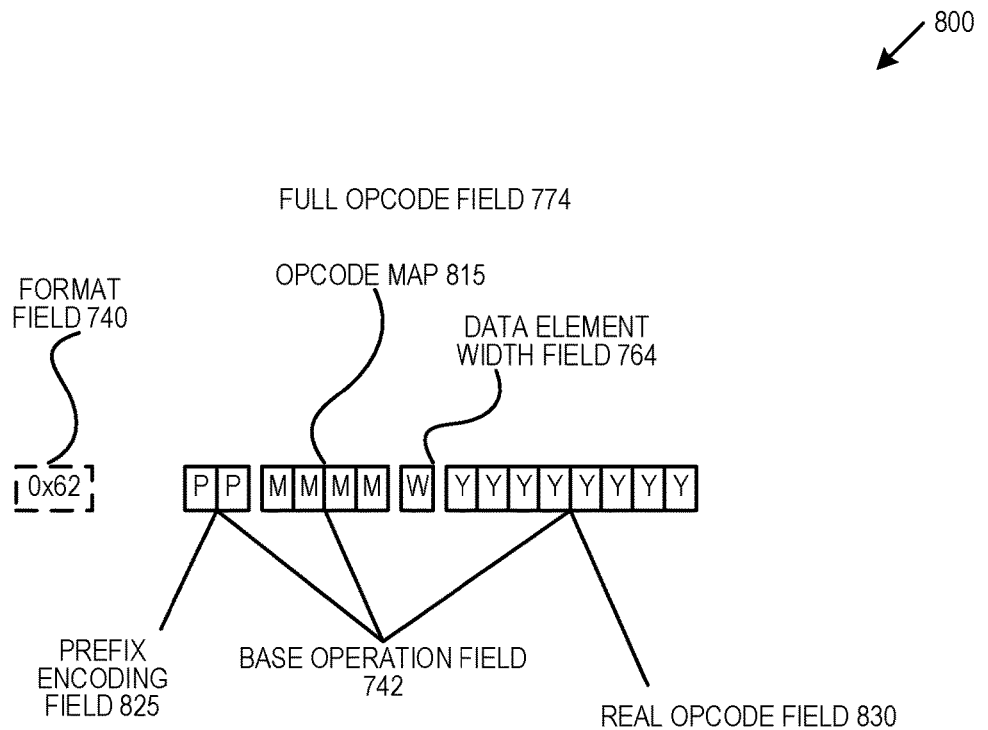

FIG. 8B is a block diagram illustrating the fields of the specific vector friendly instruction format 800 that make up the full opcode field 774 according to one embodiment of the invention. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

Figure 8C:
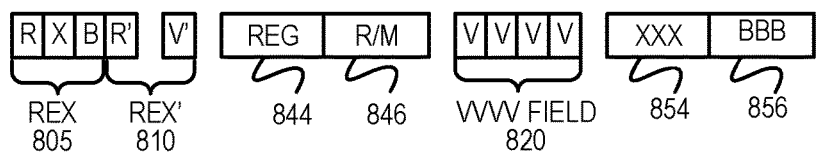

FIG. 8C is a block diagram illustrating the fields of the specific vector friendly instruction format 800 that make up the register index field 744 according to one embodiment of the invention. Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
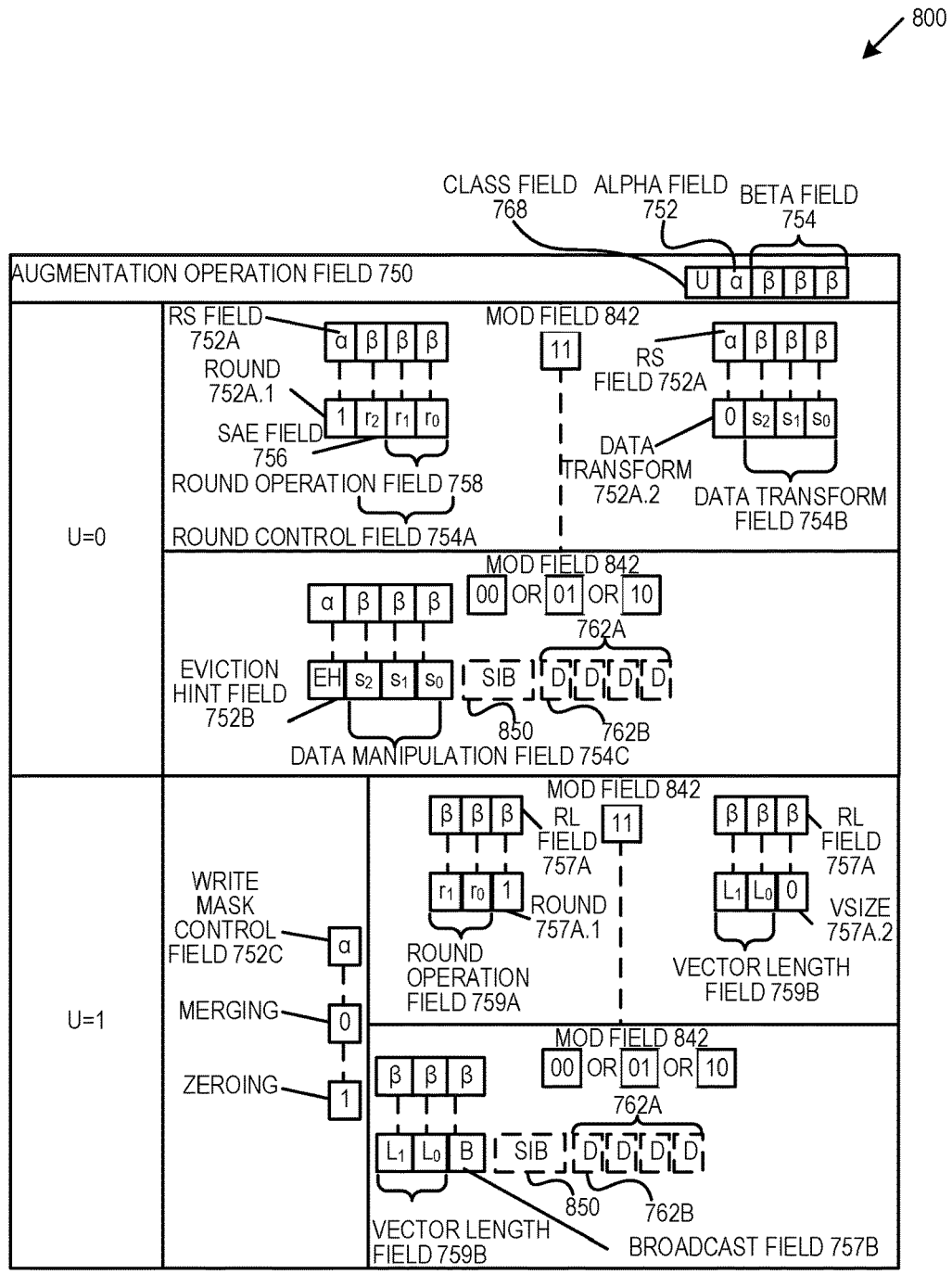

FIG. 8D is a block diagram illustrating the fields of the specific vector friendly instruction format 800 that make up the augmentation operation field 750 according to one embodiment of the invention. When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]-EH) is interpreted as the rs field 752A. When the rs field 752A contains a 1 (round 752A.1), the beta field 754 (EVEX byte 3, bits [6:4]-SSS) is interpreted as the round control field 754A. The round control field 754A includes a one bit SAE field 756 and a two bit round operation field 758. When the rs field 752A contains a 0 (data transform 752A.2), the beta field 754 (EVEX byte 3, bits [6:4]-SSS) is interpreted as a three bit data transform field 754B. When U=0 and the MOD field 842 contains 00, 01, or 10 (signifying a memory access operation), the alpha field 752 (EVEX byte 3, bit [7]-EH) is interpreted as the eviction hint (EH) field 752B and the beta field 754 (EVEX byte 3, bits [6:4]-SSS) is interpreted as a three bit data manipulation field 754C.

When U=1, the alpha field 752 (EVEX byte 3, bit [7]-EH) is interpreted as the write mask control (Z) field 752C. When U=1 and the MOD field 842 contains 11 (signifying a no memory access operation), part of the beta field 754 (EVEX byte 3, bit [4]-S0) is interpreted as the RL field 757A; when it contains a 1 (round 757A.1) the rest of the beta field 754 (EVEX byte 3, bit [6-5]-S2-1) is interpreted as the round operation field 759A, while when the RL field 757A contains a 0 (VSIZE 757.A2) the rest of the beta field 754 (EVEX byte 3, bit [6-5]-S2-1) is interpreted as the vector length field 759B (EVEX byte 3, bit [6-5]-L1-0). When U=1 and the MOD field 842 contains 00, 01, or 10 (signifying a memory access operation), the beta field 754 (EVEX byte 3, bits [6:4]-SSS) is interpreted as the vector length field 759B (EVEX byte 3, bit [6-5]-L1-0) and the broadcast field 757B (EVEX byte 3, bit [4]-B).

Example Register Architecture

Figure 9:
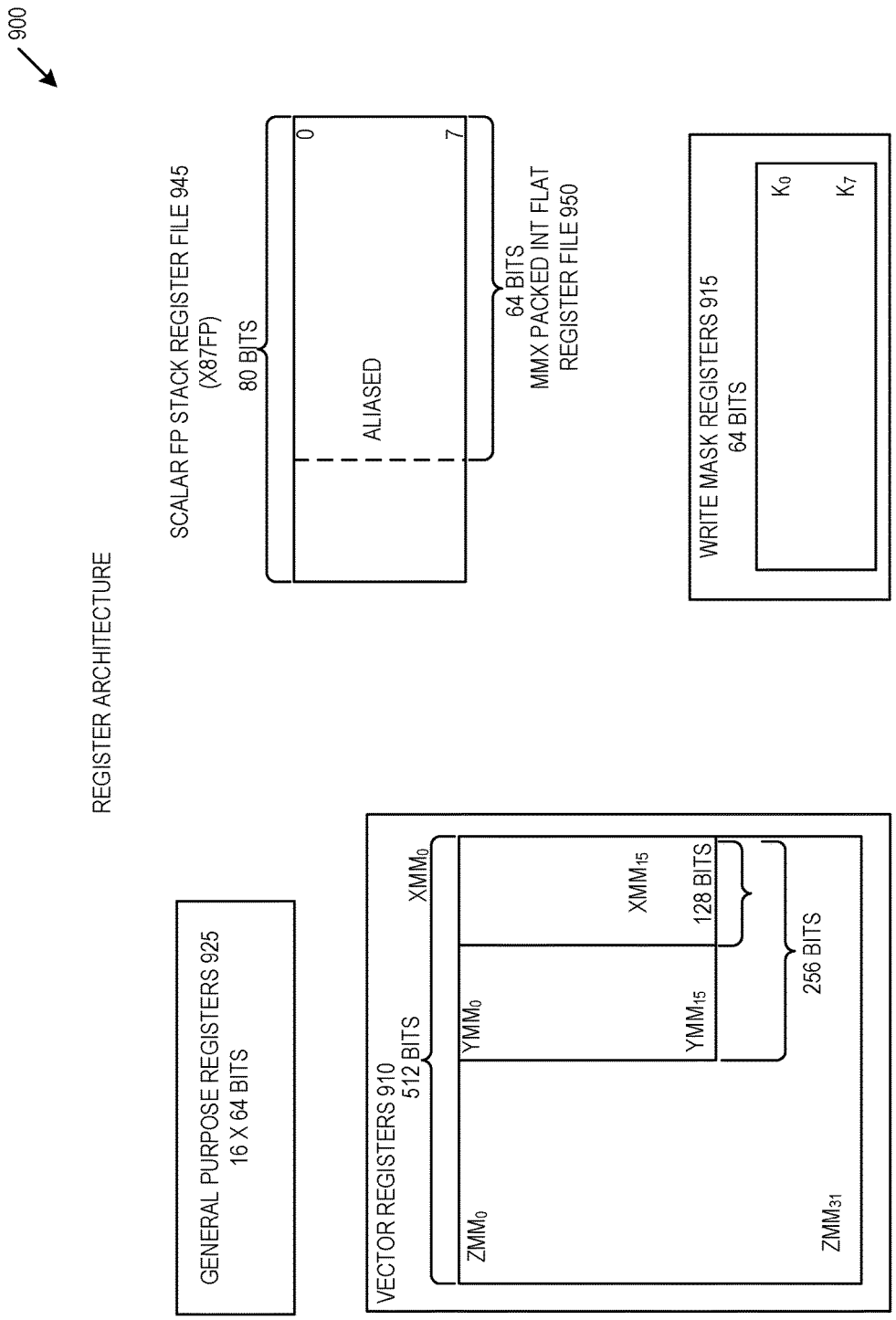
FIG. 9 is a block diagram of a register architecture according to one embodiment of the invention.

FIG. 9 is a block diagram of a register architecture 900 according to one embodiment of the invention. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 800 operates on these overlaid register file as illustrated in the below tables.

| Adjustable Vector Length | Class | Operations | Registers |
|---|---|---|---|
| Instruction Templates that do not include the | A (FIG. 7A; U = 0) | 710, 715, 725, 730 | zmm registers (the vector length is 64 byte) |
| vector length field 759B | B (FIG. 7B; U = 1) | 712 | zmm registers (the vector length is 64 byte) |
| Instruction templates that do include the vector length field 759B | B (FIG. 7B; U = 1) | 717, 727 | zmm, ymm, or xmm registers (the vector length is 64 byte, 32 byte, or 16 byte) depending on the vector length field 759B |

In other words, the vector length field 759B selects between a maximum length and one or more other shorter lengths, where each such shorter length is half the length of the preceding length; and instructions templates without the vector length field 759B operate on the maximum vector length. Further, in one embodiment, the class B instruction templates of the specific vector friendly instruction format 800 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures: In-Order and Out-of-Order Core Block Diagram

Figure 10A:
FIG. 10A is a block diagram illustrating both an example in-order pipeline and an example register renaming, out-of-order issue/execution pipeline according to an embodiment.
Figure 10B:
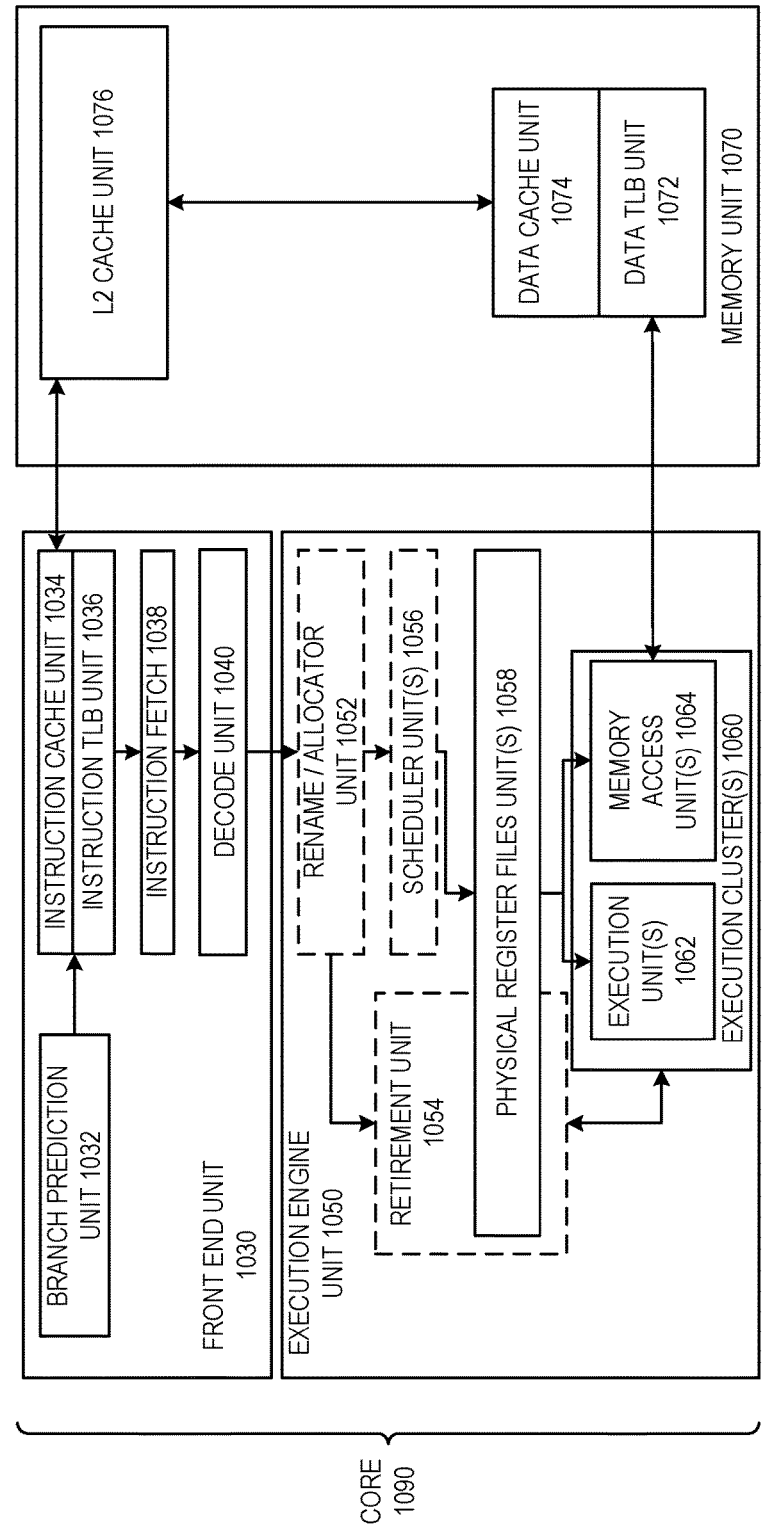
FIG. 10B is a block diagram illustrating both an example embodiment of an in-order architecture core and an example register renaming, out-of-order issue/execution architecture core to be included in a processor according to an embodiment.

FIG. 10A is a block diagram illustrating both an example in-order pipeline and an example register renaming, out-of-order issue/execution pipeline according to an embodiment. FIG. 10B is a block diagram illustrating both an example embodiment of an in-order architecture core and an example register renaming, out-of-order issue/execution architecture core to be included in a processor according to an embodiment. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one example embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the example register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Example In-Order Core Architecture

Figure 11B:
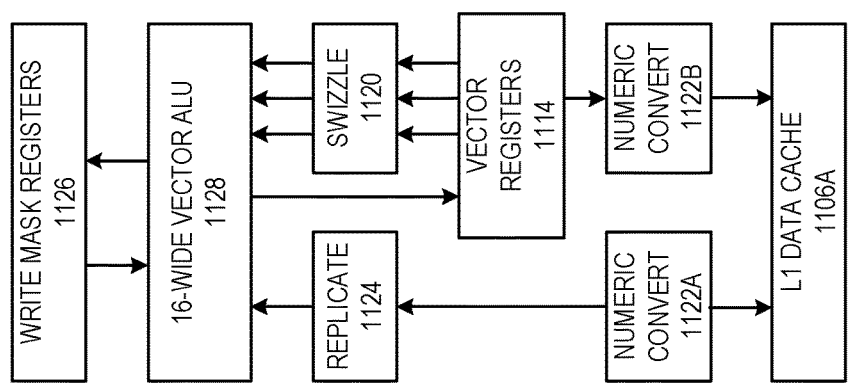
FIG. 11A-11B illustrate a block diagram of a more specific example in-order core architecture, which core would be one of several logic blocks (including other cores of the same type and/or different types) in a chip.
Figure 11A:
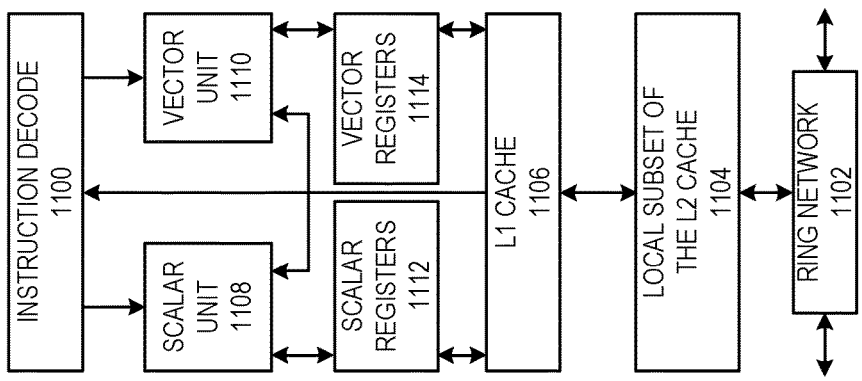

FIGS. 11A-11B illustrate a block diagram of a more specific example in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to an embodiment. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to an embodiment. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
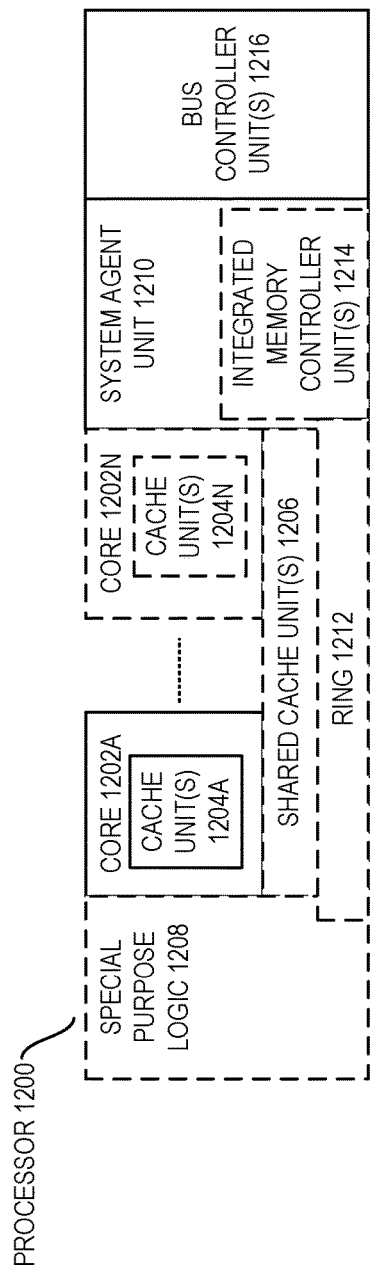
FIG. 12 is a block diagram of a processor that may have more than one core, may have an integrated memory controller, and may have integrated graphics according to an embodiment.

FIG. 12 is a block diagram of a processor 1200 that may have more than one core, may have an integrated memory controller, and may have integrated graphics according to an embodiment. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Example Computer Architectures

FIGS. 13-16 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
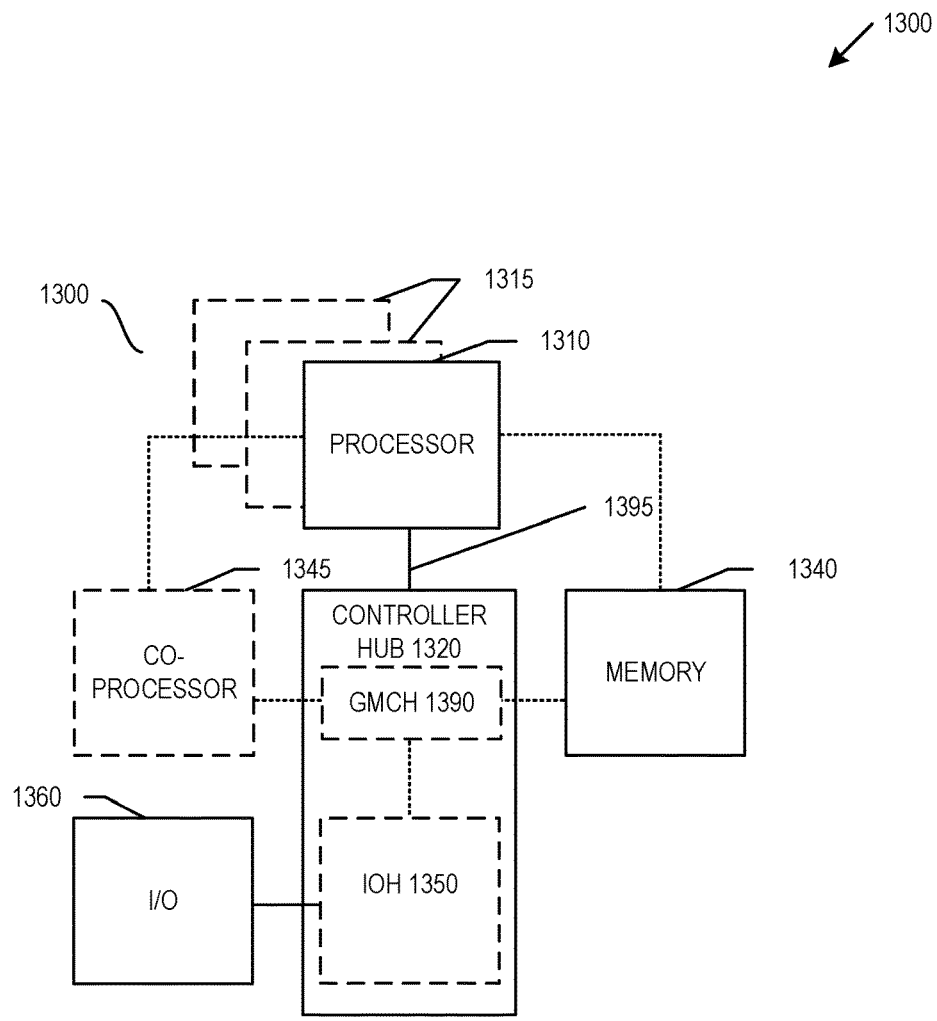
FIG. 13 is a block diagram of a system in accordance with one embodiment.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
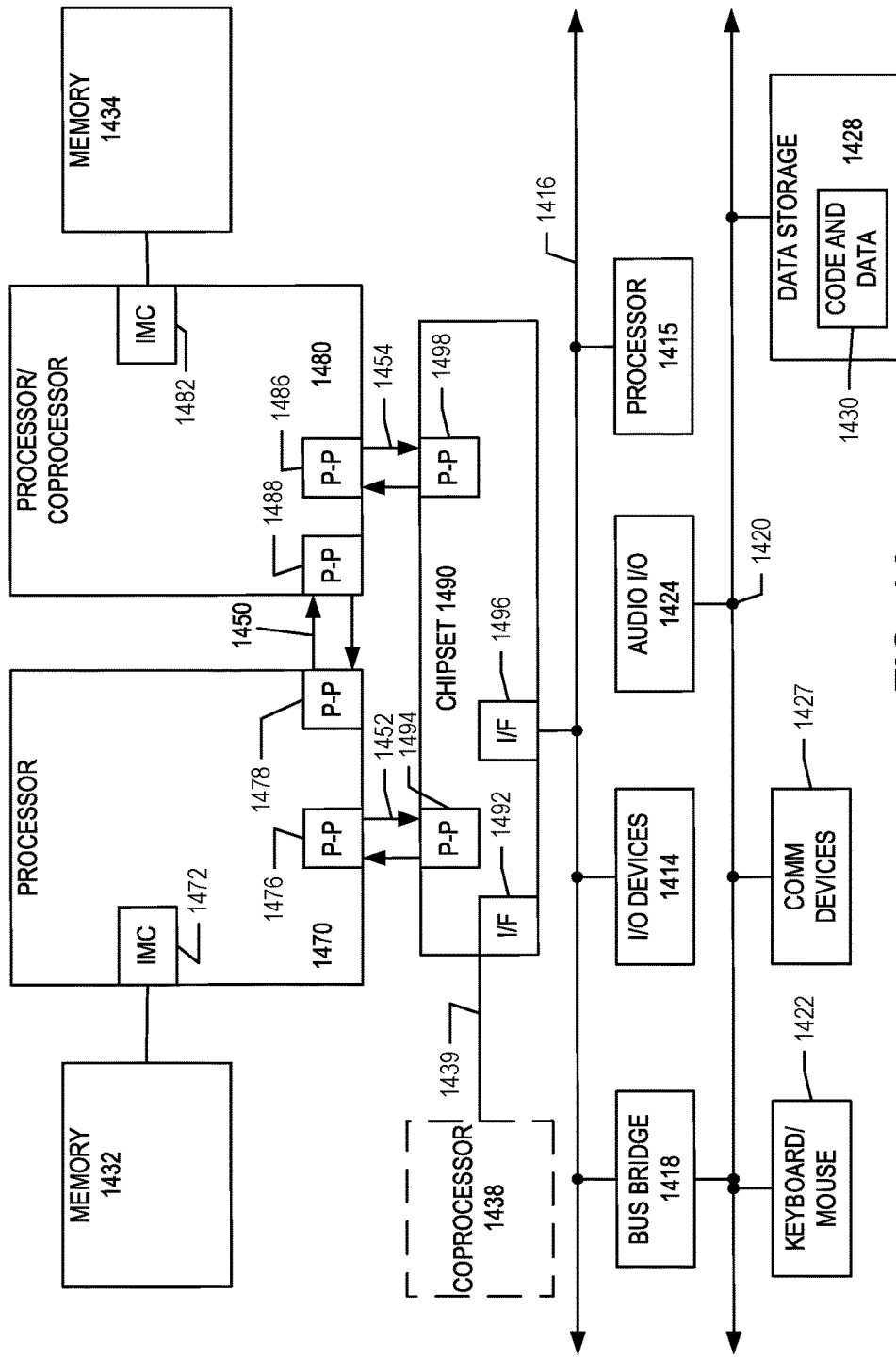
FIG. 14 is a block diagram of a first more specific example system in accordance with an embodiment.

Referring now to FIG. 14, shown is a block diagram of a first more specific example system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
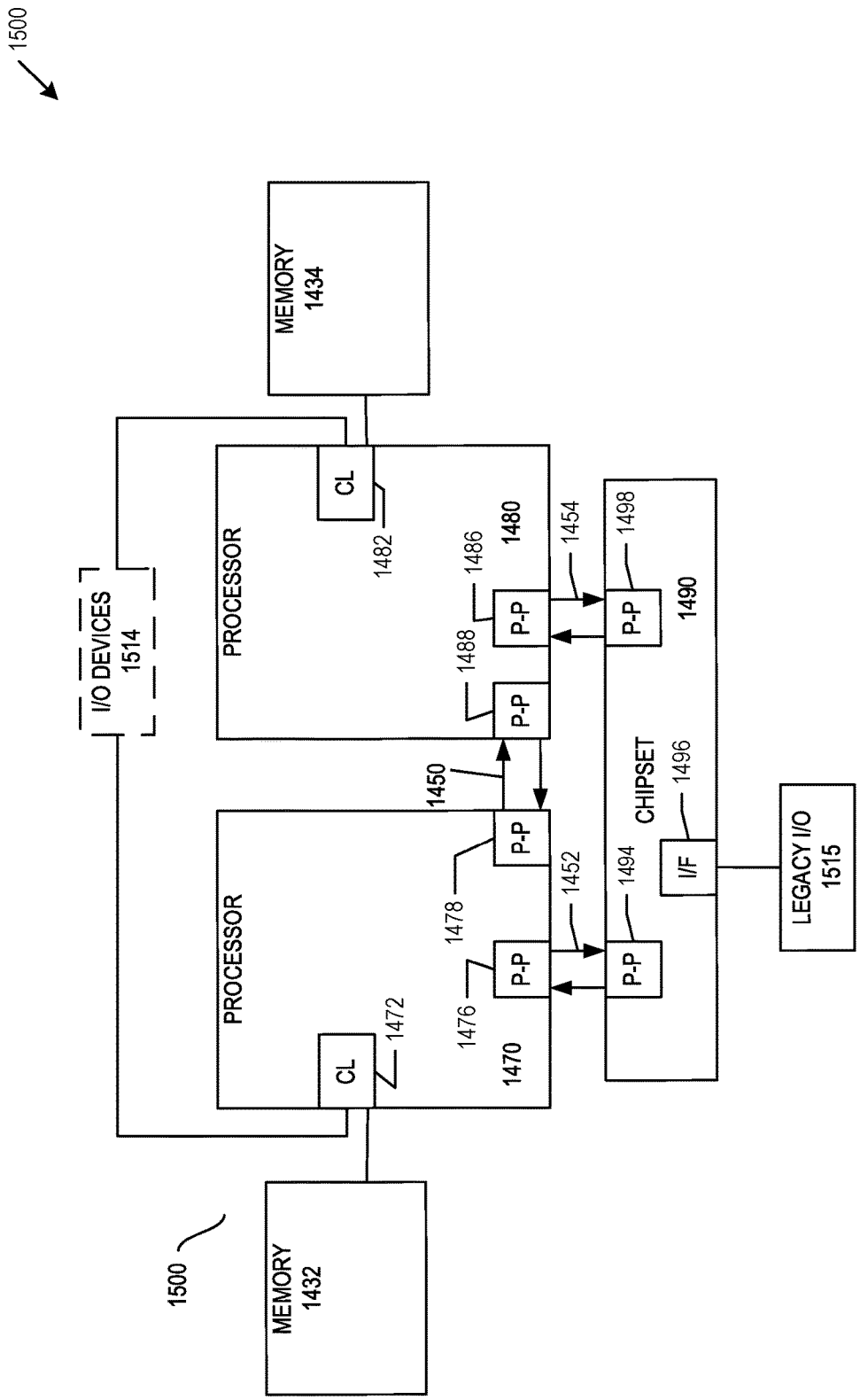
FIG. 15 is a block diagram of a second more specific example system in accordance with an embodiment.

Referring now to FIG. 15, shown is a block diagram of a second more specific example system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
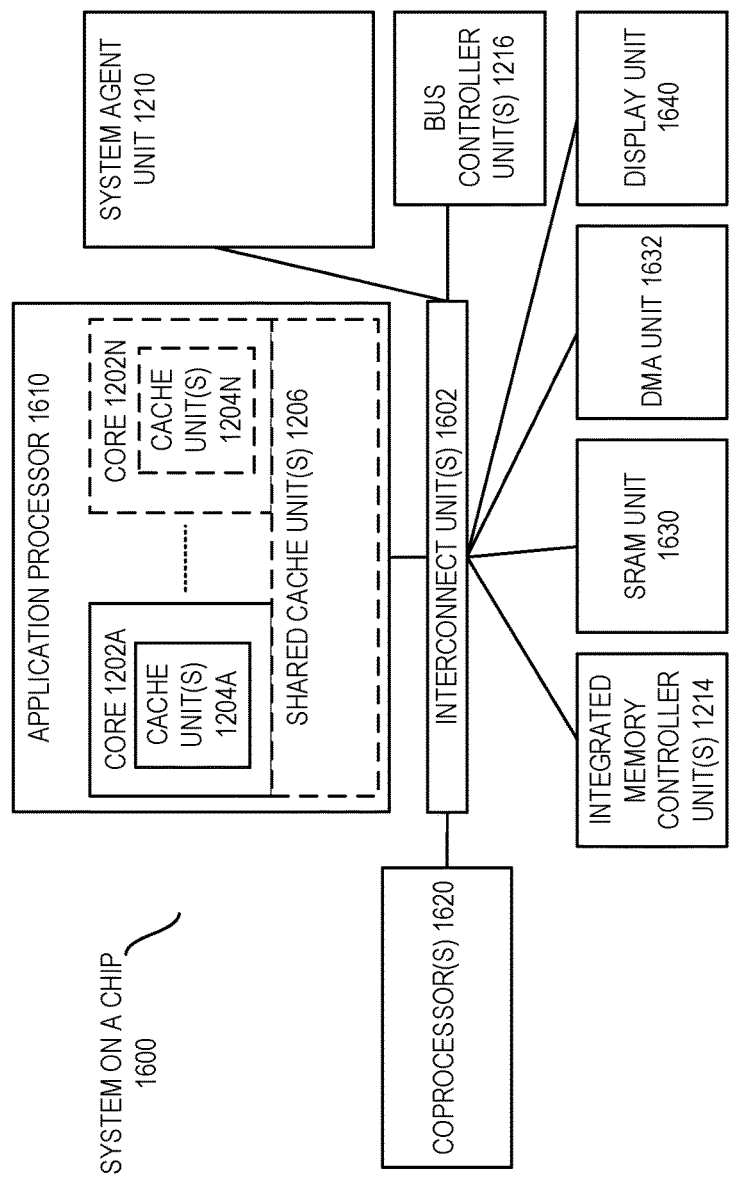
FIG. 16 is a block diagram of a SoC in accordance with an embodiment.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
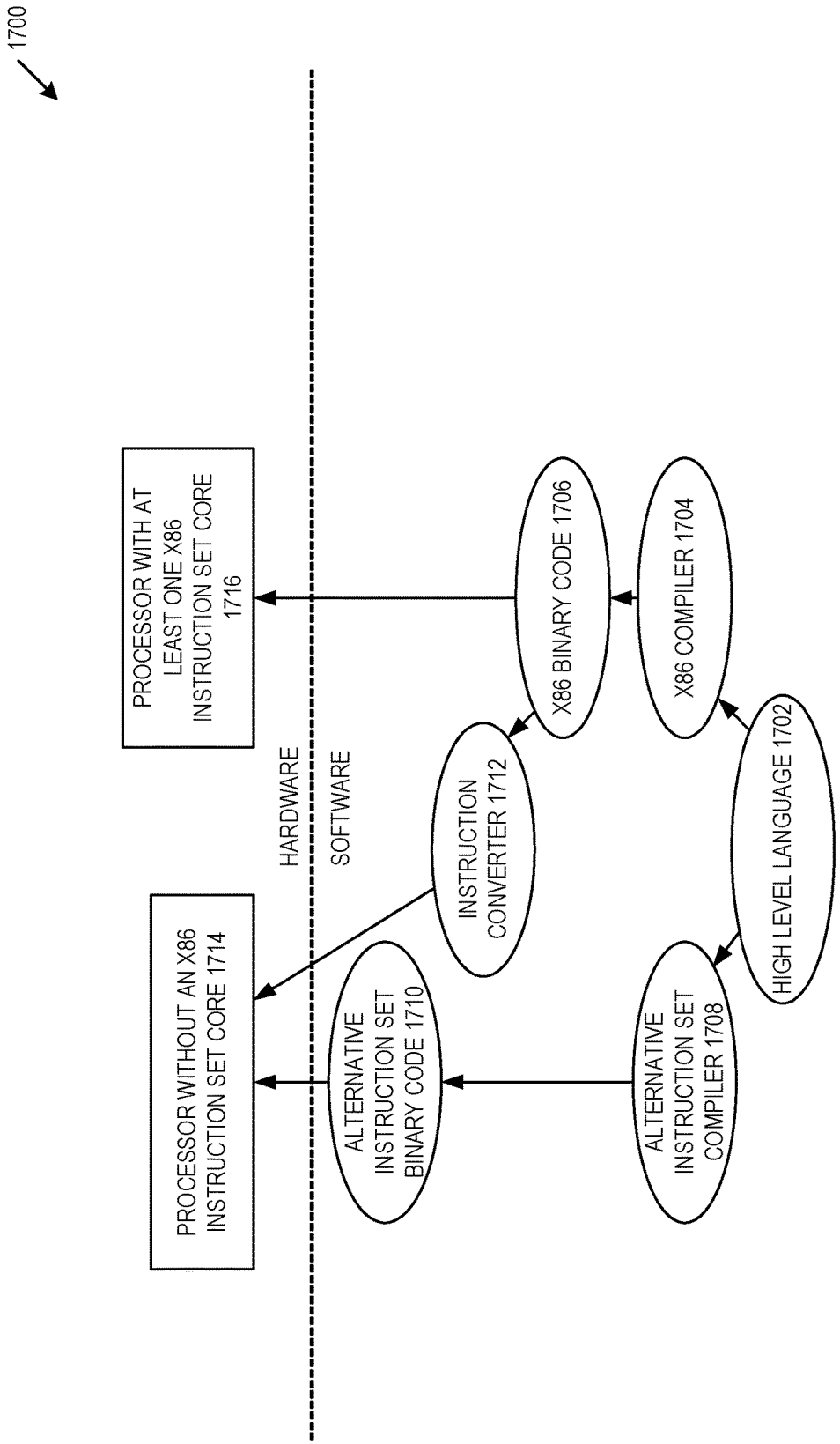
FIG. 17 is a block diagram contrasting the use of a software instruction converter to convert binary instructions in a source instruction set to binary instructions in a target instruction set according to an embodiment.

FIG. 17 is a block diagram contrasting the use of a software instruction converter to convert binary instructions in a source instruction set to binary instructions in a target instruction set according to an embodiment. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

To better illustrate the method and apparatuses disclosed herein, a non-limiting list of embodiments is provided here.

Example 1 is a hardware accelerated (HWA) matrix-solve system comprising: a fetch-A block to retrieve and provide a portion of a matrix A; and a matrix column computation block including: an X-buffer block to fetch at least one value of a matrix X; a within-column parallel compute block to generate a plurality of partial dot products based on the portion of the matrix A and on the at least one value of the matrix X; and a serial compute block to generate a new element of matrix X based on the plurality of partial dot products, the new element of matrix X provided to the X-buffer block for storage in a memory.

In Example 2, the subject matter of Example 1 optionally includes the matrix column computation block including a fetch-B block to retrieve and provide a matrix B element to the parallel compute block.

In Example 3, the subject matter of Example 2 optionally includes the parallel compute block including a negation block to generate a negated matrix B element.

In Example 4, the subject matter of Example 3 optionally includes the serial compute block further to generate a matrix-solve difference value based on a sum of the negated matrix B element and the plurality of partial dot products.

In Example 5, the subject matter of Example 4 optionally includes wherein the serial compute block including a matrix multiplier block to generate the new element of matrix X by multiplying the matrix-solve difference value by a matrix A inverse, the matrix A inverse received from the parallel compute block at the serial compute block.

In Example 6, the subject matter of Example 5 optionally includes wherein the matrix multiplier block includes a multi-cycle-path multiplier block.

In Example 7, the subject matter of any one or more of Examples 5-6 optionally include wherein: the fetch-A block is further to retrieve and provide the matrix A inverse to the parallel compute block; and the parallel compute block further to receive the matrix A inverse and provide the matrix A inverse to the serial compute block.

In Example 8, the subject matter of any one or more of Examples 5-7 optionally include wherein: the fetch-A block is further to retrieve and provide an uninverted matrix A to the parallel compute block; and the parallel compute block further includes a matrix inverse block to generate the matrix A inverse based on the uninverted matrix A.

In Example 9, the subject matter of any one or more of Examples 1-8 optionally include wherein the fetch-A block includes: a fetch-A memory address register to send a memory address request of the portion of matrix A; and a fetch-A memory data register FIFO buffer to store and provide the portion of matrix A.

In Example 10, the subject matter of any one or more of Examples 2-9 optionally include wherein the fetch-B block includes: a fetch-B memory address register to send a memory address request for the matrix B element; and a fetch-B memory data register first-in-first-out (FIFO) buffer to store and provide the matrix B element.

In Example 11, the subject matter of any one or more of Examples 1-10 optionally include wherein the determined value of the matrix X includes at least one of a forward substitution value and a backward substitution value.

In Example 12, the subject matter of Example 11 optionally includes wherein the forward substitution value is determined according to $$X_{pq} = \frac{B_{pq} - \sum_{i=0}^{p-1} A_{pi} X_{iq}}{A_{pp}}.$$

In Example 13, the subject matter of any one or more of Examples 11-12 optionally include wherein the forward substitution value is determined according to $$X_{pq} = \frac{B_{pq} - \sum_{i=p+1}^{M-1} A_{pi} X_{iq}}{A_{pp}}.$$

In Example 14, the subject matter of any one or more of Examples 1-13 optionally include a plurality of column compute blocks, each of the plurality of column compute blocks including a matrix column computation block.

In Example 15, the subject matter of Example 14 optionally includes a plurality of memory arbiters to arbitrate a plurality of columnar memory access requests from the plurality of column compute blocks.

In Example 16, the subject matter of any one or more of Examples 1-15 optionally include wherein the parallel compute block includes a negative multiply-and-accumulate (MAC) block to negate the portion of the matrix B.

In Example 17, the subject matter of Example 16 optionally includes wherein the parallel compute block includes a plurality of partial dot product blocks to determine the plurality of partial dot products.

In Example 18, the subject matter of Example 17 optionally includes wherein each of the plurality of partial dot product blocks includes a columnar MAC, a columnar FIFO, and a diagonal element FIFO.

In Example 19, the subject matter of any one or more of Examples 1-18 optionally include wherein the serial compute block includes a serial MAC to receive the plurality of partial dot products and determine the new element of matrix X.

In Example 20, the subject matter of Example 19 optionally includes wherein: the determined value of the matrix X includes the forward substitution value; and determining the new element of matrix X includes: determining a new element of matrix X for each of a plurality of rows in matrix X based on at least one of the received plurality of partial dot products; and determining an additional dot product based on a previously determined new element of matrix X.

In Example 21, the subject matter of Example 20 optionally includes wherein: the determined value of the matrix X includes the backward substitution value; and determining the new element of matrix X includes accumulating the received plurality of partial dot products.

In Example 22, the subject matter of Example 21 optionally includes wherein the serial compute block further includes a multi-cycle-path (MCP) multiplier to accumulate the received plurality of partial dot products.

In Example 23, the subject matter of Example 22 optionally includes wherein the serial compute block further includes a serial negation block to negate the accumulated received plurality of partial dot products.

In Example 24, the subject matter of any one or more of Examples 1-23 optionally include wherein the X-buffer block includes a local column buffer and a pre-fetch buffer to fetch and provide the at least one value of a matrix X to the parallel compute block.

Example 25 is a hardware accelerated (HWA) matrix-solve method comprising: providing a portion of a matrix A at a fetch-A block to a matrix column computation block; and generating a new element of matrix X at the matrix column computation block, including: fetching at least one value of a matrix X at an X-buffer block within the matrix column computation block; generating a plurality of partial dot products at a within-column parallel compute block within the matrix column computation block, the plurality of partial dot products determined based on the portion of the matrix A and on the at least one value of the matrix X; and generating the new element of matrix X at a serial compute block within the matrix column computation block, the new element of matrix X determined based on the plurality of partial dot products.

In Example 26, the subject matter of Example 25 optionally includes fetching a matrix B element at a fetch-B block within the matrix column computation block; sending the matrix B element from the fetch-B block to the parallel compute block; generating a negated matrix B element at a negation block within the parallel compute block; and generating a matrix-solve difference value at the serial compute block, the matrix-solve difference value based on a sum of the negated matrix B element and the plurality of partial dot products.

In Example 27, the subject matter of Example 26 optionally includes receiving a matrix A inverse from the parallel compute block at the serial compute block, wherein generating the new element of matrix X includes multiplying the matrix-solve difference value by the matrix A inverse at a matrix multiplier block within the serial compute block.

In Example 28, the subject matter of Example 27 optionally includes wherein the matrix multiplier block includes a multi-cycle-path multiplier block.

In Example 29, the subject matter of any one or more of Examples 27-28 optionally include wherein receiving a matrix A inverse from the parallel compute block at the serial compute block includes: retrieving the matrix A inverse at the fetch-A block; and sending the matrix A inverse from the fetch-A block through the parallel compute block to the serial compute block.

In Example 30, the subject matter of any one or more of Examples 27-29 optionally include wherein receiving a matrix A inverse from the parallel compute block at the serial compute block includes: retrieving an uninverted matrix A at the fetch-A block; generating the matrix A inverse based on the uninverted matrix A at a matrix inverse block within the parallel compute block; and sending the matrix A inverse from the matrix inverse block to the serial compute block.

In Example 31, the subject matter of any one or more of Examples 25-30 optionally include sending a memory address request for the portion of matrix A from a fetch-A memory address register within the fetch-A block; and storing and providing the portion of matrix A at a fetch-A memory data register FIFO buffer within the fetch-A block.

In Example 32, the subject matter of any one or more of Examples 26-31 optionally include sending a memory address request for the portion of matrix B from a fetch-B memory address register within the fetch-B block; and storing and providing the portion of matrix B at a fetch-B memory data register first-in-first-out (FIFO) buffer within the fetch-B block.

In Example 33, the subject matter of any one or more of Examples 25-32 optionally include wherein determining the value of the matrix X includes determining at least one of a forward substitution value and a backward substitution value.

In Example 34, the subject matter of Example 33 optionally includes wherein the forward substitution value is determined according to $$X_{pq} = \frac{B_{pq} - \sum_{i=0}^{p-1} A_{pi} X_{iq}}{A_{pp}}.$$

In Example 35, the subject matter of any one or more of Examples 33-34 optionally include wherein the forward substitution value is determined according to $$X_{pq} = \frac{B_{pq} - \sum_{i=p+1}^{M-1} A_{pi} X_{iq}}{A_{pp}}.$$

In Example 36, the subject matter of any one or more of Examples 25-35 optionally include wherein the matrix column computation block includes a plurality of column compute blocks, each of the plurality of column compute blocks including a matrix column computation block.

In Example 37, the subject matter of Example 36 optionally includes arbitrating a plurality of columnar memory access requests from the plurality of column compute blocks at a plurality of memory arbiters.

In Example 38, the subject matter of any one or more of Examples 25-37 optionally include negating the portion of the matrix B at a negative multiply-and-accumulate (MAC) block within the parallel compute block.

In Example 39, the subject matter of Example 38 optionally includes determining the plurality of partial dot products at a plurality of partial dot product blocks within the parallel compute block.

In Example 40, the subject matter of Example 39 optionally includes wherein each of the plurality of partial dot product blocks includes a columnar MAC, a columnar FIFO, and a diagonal element FIFO.

In Example 41, the subject matter of any one or more of Examples 25-40 optionally include receiving the plurality of partial dot products at a serial MAC within the serial compute block; and determining the new element of matrix X at the serial MAC.

In Example 42, the subject matter of Example 41 optionally includes wherein: the determined value of the matrix X includes the forward substitution value; and determining the new element of matrix X includes: determining a new element of matrix X for each of a plurality of rows in matrix X based on at least one of the received plurality of partial dot products; and determining an additional dot product based on a previously determined new element of matrix X.

In Example 43, the subject matter of Example 42 optionally includes wherein: the determined value of the matrix X includes the backward substitution value; and determining the new element of matrix X includes accumulating the received plurality of partial dot products.

In Example 44, the subject matter of Example 43 optionally includes accumulating the received plurality of partial dot products at a multi-cycle-path (MCP) multiplier within the serial compute block.

In Example 45, the subject matter of Example 44 optionally includes negating the accumulated received plurality of partial dot products at a serial negation block within the serial compute block.

In Example 46, the subject matter of any one or more of Examples 25-45 optionally include receiving the determined value of the matrix X at an X-buffer block within the matrix column computation block; and writing the determined value of the matrix X at the X-buffer block to a memory.

In Example 47, the subject matter of Example 46 optionally includes fetching a local column at a pre-fetch buffer within the X-buffer block; and providing the local column from the pre-fetch buffer to the parallel compute block.

Example 48 is at least one machine-readable medium including instructions, which when executed by a computing system, cause the computing system to perform any of the methods of Examples 25-47.

Example 49 is an apparatus comprising means for performing any of the methods of Examples 25-47.

Example 50 is at least one non-transitory machine-readable storage medium, comprising a plurality of instructions that, responsive to being executed with processor circuitry of a computer-controlled device, cause the computer-controlled device to: provide a portion of a matrix A at a fetch-A block to a matrix column computation block; and generate a new element of matrix X at the matrix column computation block, including instructions causing the computer controlled device to: fetch at least one value of a matrix X at an X-buffer block within the matrix column computation block; generate a plurality of partial dot products at a within-column parallel compute block within the matrix column computation block, the plurality of partial dot products determined based on the portion of the matrix A and on the at least one value of the matrix X; and generate the new element of matrix X at a serial compute block within the matrix column computation block, the new element of matrix X determined based on the plurality of partial dot products.

In Example 51, the subject matter of Example 50 optionally includes the instructions further causing the computer-controlled device to: fetch a matrix B element at a fetch-B block within the matrix column computation block; send the matrix B element from the fetch-B block to the parallel compute block; generate a negated matrix B element at a negation block within the parallel compute block; and generate a matrix-solve difference value at the serial compute block, the matrix-solve difference value based on a sum of the negated matrix B element and the plurality of partial dot products.

In Example 52, the subject matter of Example 51 optionally includes the instructions further causing the computer-controlled device to receive a matrix A inverse from the parallel compute block at the serial compute block, wherein the instructions causing the computer-controlled device to generate the new element of matrix X includes instructions further causing the computer-controlled device to multiply the matrix-solve difference value by the matrix A inverse at a matrix multiplier block within the serial compute block.

In Example 53, the subject matter of Example 52 optionally includes wherein the matrix multiplier block includes a multi-cycle-path multiplier block.

In Example 54, the subject matter of any one or more of Examples 52-53 optionally include wherein the instructions causing the computer-controlled device to receive a matrix A inverse from the parallel compute block at the serial compute block further include instructions causing the computer-controlled device to: retrieve the matrix A inverse at the fetch-A block; and send the matrix A inverse from the fetch-A block through the parallel compute block to the serial compute block.

In Example 55, the subject matter of any one or more of Examples 52-54 optionally include wherein the instructions causing the computer-controlled device to receive a matrix A inverse from the parallel compute block at the serial compute block further include instructions causing the computer-controlled device to: retrieve an uninverted matrix A at the fetch-A block; generate the matrix A inverse based on the uninverted matrix A at a matrix inverse block within the parallel compute block; and send the matrix A inverse from the matrix inverse block to the serial compute block.

In Example 56, the subject matter of any one or more of Examples 50-55 optionally include the instructions further causing the computer-controlled device to: send a memory address request for the portion of matrix A from a fetch-A memory address register within the fetch-A block; and store and provide the portion of matrix A at a fetch-A memory data register FIFO buffer within the fetch-A block.

In Example 57, the subject matter of any one or more of Examples 51-56 optionally include the instructions further causing the computer-controlled device to: send a memory address request for the portion of matrix B from a fetch-B memory address register within the fetch-B block; and store and provide the portion of matrix B at a fetch-B memory data register first-in-first-out (FIFO) buffer within the fetch-B block.

In Example 58, the subject matter of any one or more of Examples 50-57 optionally include wherein the instructions causing the computer-controlled device to determine the value of the matrix X further includes instructions causing the computer-controlled device to determine at least one of a forward substitution value and a backward substitution value.

In Example 59, the subject matter of Example 58 optionally includes wherein the forward substitution value is determined according to $$X_{pq} = \frac{B_{pq} - \sum_{i=0}^{p-1} A_{pi} X_{iq}}{A_{pp}}.$$

In Example 60, the subject matter of any one or more of Examples 58-59 optionally include wherein the forward substitution value is determined according to $$X_{pq} = \frac{B_{pq} - \sum_{i=p+1}^{M-1} A_{pi} X_{iq}}{A_{pp}}.$$

In Example 61, the subject matter of any one or more of Examples 50-60 optionally include wherein the matrix column computation block includes a plurality of column compute blocks, each of the plurality of column compute blocks including a matrix column computation block.

In Example 62, the subject matter of Example 61 optionally includes the instructions further causing the computer-controlled device to arbitrate a plurality of columnar memory access requests from the plurality of column compute blocks at a plurality of memory arbiters.

In Example 63, the subject matter of any one or more of Examples 50-62 optionally include the instructions further causing the computer-controlled device to negate the portion of the matrix B at a negative multiply-and-accumulate (MAC) block within the parallel compute block.

In Example 64, the subject matter of Example 63 optionally includes the instructions further causing the computer-controlled device to determine the plurality of partial dot products at a plurality of partial dot product blocks within the parallel compute block.

In Example 65, the subject matter of Example 64 optionally includes wherein each of the plurality of partial dot product blocks includes a columnar MAC, a columnar FIFO, and a diagonal element FIFO.

In Example 66, the subject matter of any one or more of Examples 50-65 optionally include the instructions further causing the computer-controlled device to: receive the plurality of partial dot products at a serial MAC within the serial compute block; and determine the new element of matrix X at the serial MAC.

In Example 67, the subject matter of Example 66 optionally includes wherein: the determined value of the matrix X includes the forward substitution value; and the instructions causing the computer-controlled device to determine the new element of matrix X further includes instructions causing the computer-controlled device to: determine a new element of matrix X for each of a plurality of rows in matrix X based on at least one of the received plurality of partial dot products; and determine an additional dot product based on a previously determined new element of matrix X.

In Example 68, the subject matter of Example 67 optionally includes wherein: the determined value of the matrix X includes the backward substitution value; and the instructions causing the computer-controlled device to determine the new element of matrix X includes instructions causing the computer-controlled device to accumulate the received plurality of partial dot products.

In Example 69, the subject matter of Example 68 optionally includes the instructions further causing the computer-controlled device to accumulate the received plurality of partial dot products at a multi-cycle-path (MCP) multiplier within the serial compute block.

In Example 70, the subject matter of Example 69 optionally includes the instructions further causing the computer-controlled device to negate the accumulated received plurality of partial dot products at a serial negation block within the serial compute block.

In Example 71, the subject matter of any one or more of Examples 50-70 optionally include the instructions further causing the computer-controlled device to: receive the determined value of the matrix X at an X-buffer block within the matrix column computation block; and writing the determined value of the matrix X at the X-buffer block to a memory.

In Example 72, the subject matter of Example 71 optionally includes the instructions further causing the computer-controlled device to: fetch a local column at a pre-fetch buffer within the X-buffer block; and provide the local column from the pre-fetch buffer to the parallel compute block.

Example 73 is a hardware accelerated (HWA) matrix-solve apparatus comprising: means for providing a portion of a matrix A at a fetch-A block to a matrix column computation block; and means for generating a new element of matrix X at the matrix column computation block, including: means for fetching at least one value of a matrix X at an X-buffer block within the matrix column computation block; means for generating a plurality of partial dot products at a within-column parallel compute block within the matrix column computation block, the plurality of partial dot products determined based on the portion of the matrix A and on the at least one value of the matrix X; and means for generating the new element of matrix X at a serial compute block within the matrix column computation block, the new element of matrix X determined based on the plurality of partial dot products.

In Example 74, the subject matter of Example 73 optionally includes means for fetching a matrix B element at a fetch-B block within the matrix column computation block; means for sending the matrix B element from the fetch-B block to the parallel compute block; means for generating a negated matrix B element at a negation block within the parallel compute block; and means for generating a matrix-solve difference value at the serial compute block, the matrix-solve difference value based on a sum of the negated matrix B element and the plurality of partial dot products.

In Example 75, the subject matter of Example 74 optionally includes means for receiving a matrix A inverse from the parallel compute block at the serial compute block, wherein means for generating the new element of matrix X includes multiplying the matrix-solve difference value by the matrix A inverse at a matrix multiplier block within the serial compute block.

In Example 76, the subject matter of Example 75 optionally includes wherein the matrix multiplier block includes a multi-cycle-path multiplier block.

In Example 77, the subject matter of any one or more of Examples 75-76 optionally include wherein means for receiving a matrix A inverse from the parallel compute block at the serial compute block includes: means for retrieving the matrix A inverse at the fetch-A block; and means for sending the matrix A inverse from the fetch-A block through the parallel compute block to the serial compute block.

In Example 78, the subject matter of any one or more of Examples 75-77 optionally include wherein means for receiving a matrix A inverse from the parallel compute block at the serial compute block includes: means for retrieving an uninverted matrix A at the fetch-A block; means for generating the matrix A inverse based on the uninverted matrix A at a matrix inverse block within the parallel compute block; and means for sending the matrix A inverse from the matrix inverse block to the serial compute block.

In Example 79, the subject matter of any one or more of Examples 73-78 optionally include means for sending a memory address request for the portion of matrix A from a fetch-A memory address register within the fetch-A block; and means for storing and means for providing the portion of matrix A at a fetch-A memory data register FIFO buffer within the fetch-A block.

In Example 80, the subject matter of any one or more of Examples 74-79 optionally include means for sending a memory address request for the portion of matrix B from a fetch-B memory address register within the fetch-B block; and means for storing and means for providing the portion of matrix B at a fetch-B memory data register first-in-first-out (FIFO) buffer within the fetch-B block.

In Example 81, the subject matter of any one or more of Examples 73-80 optionally include wherein means for determining the value of the matrix X includes means for determining at least one of a forward substitution value and a backward substitution value.

In Example 82, the subject matter of Example 81 optionally includes wherein the forward substitution value is determined according to $$X_{pq} = \frac{B_{pq} - \sum_{i=0}^{p-1} A_{pi} X_{iq}}{A_{pp}}.$$

In Example 83, the subject matter of any one or more of Examples 81-82 optionally include wherein the forward substitution value is determined according to $$X_{pq} = \frac{B_{pq} - \sum_{i=p+1}^{M-1} A_{pi} X_{iq}}{A_{pp}}.$$

In Example 84, the subject matter of any one or more of Examples 73-83 optionally include wherein the matrix column computation block includes a plurality of column compute blocks, each of the plurality of column compute blocks including a matrix column computation block.

In Example 85, the subject matter of Example 84 optionally includes arbitrating a plurality of columnar memory access requests from the plurality of column compute blocks at a plurality of memory arbiters.

In Example 86, the subject matter of any one or more of Examples 73-85 optionally include negating the portion of the matrix B at a negative multiply-and-accumulate (MAC) block within the parallel compute block.

In Example 87, the subject matter of Example 86 optionally includes means for determining the plurality of partial dot products at a plurality of partial dot product blocks within the parallel compute block.

In Example 88, the subject matter of Example 87 optionally includes wherein each of the plurality of partial dot product blocks includes a columnar MAC, a columnar FIFO, and a diagonal element FIFO.

In Example 89, the subject matter of any one or more of Examples 73-88 optionally include means for receiving the plurality of partial dot products at a serial MAC within the serial compute block; and means for determining the new element of matrix X at the serial MAC.

In Example 90, the subject matter of Example 89 optionally includes wherein: the determined value of the matrix X includes the forward substitution value; and means for determining the new element of matrix X includes: means for determining a new element of matrix X for each of a plurality of rows in matrix X based on at least one of the received plurality of partial dot products; and means for determining an additional dot product based on a previously determined new element of matrix X.

In Example 91, the subject matter of Example 90 optionally includes wherein: the determined value of the matrix X includes the backward substitution value; and means for determining the new element of matrix X includes accumulating the received plurality of partial dot products.

In Example 92, the subject matter of Example 91 optionally includes accumulating the received plurality of partial dot products at a multi-cycle-path (MCP) multiplier within the serial compute block.

In Example 93, the subject matter of Example 92 optionally includes negating the accumulated received plurality of partial dot products at a serial negation block within the serial compute block.

In Example 94, the subject matter of any one or more of Examples 73-93 optionally include means for receiving the determined value of the matrix X at an X-buffer block within the matrix column computation block; and means for writing the determined value of the matrix X at the X-buffer block to a memory.

In Example 95, the subject matter of Example 94 optionally includes means for fetching a local column at a pre-fetch buffer within the X-buffer block; and means for providing the local column from the pre-fetch buffer to the parallel compute block.

Example 96 is at least one machine-readable medium including instructions, which when executed by a machine, cause the machine to perform operations of any of the operations of Examples 1-95.

Example 97 is an apparatus comprising means for performing any of the operations of Examples 1-95.

Example 98 is a system to perform the operations of any of the Examples 1-95.

Example 99 is a method to perform the operations of any of the Examples 1-95.

The above detailed description includes references to the accompanying drawings, which form a part of the detailed description. The drawings show, by way of illustration, specific embodiments in which the subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

The invention claimed is:

1. A hardware accelerated (HWA) matrix-solve system comprising:
a fetch-A block to retrieve and provide a portion of a matrix A; and
a matrix column computation block including:
an X-buffer block to fetch at least one value of a matrix X;
a within-column parallel compute block to generate a plurality of partial dot products based on the portion of the matrix A and on the at least one value of the matrix X; and
a serial compute block to generate a new element of matrix X based on the plurality of partial dot products, the new element of matrix X provided to the X-buffer block for storage in a memory.

2. The HWA matrix-solve system of claim 1, the matrix column computation block including a fetch-B block to retrieve and provide a matrix B element to the parallel compute block.

3. The HWA matrix-solve system of claim 2, the parallel compute block including a negation block to generate a negated matrix B element.

4. The HWA matrix-solve system of claim 3, the serial compute block further to generate a matrix-solve difference value based on a sum of the negated matrix B element and the plurality of partial dot products.

5. The HWA matrix-solve system of claim 4, wherein the serial compute block including a matrix multiplier block to generate the new element of matrix X by multiplying the matrix-solve difference value by a matrix A inverse, the matrix A inverse received from the parallel compute block at the serial compute block.

6. The HWA matrix-solve system of claim 5, wherein:
the fetch-A block is further to retrieve and provide the matrix A inverse to the parallel compute block; and
the parallel compute block further to receive the matrix A inverse and provide the matrix A inverse to the serial compute block.

7. The HWA matrix-solve system of claim 2, wherein the fetch-B block includes:
a fetch-B memory address register to send a memory address request for the matrix B element; and
a fetch-B memory data register FIFO buffer to store and provide the matrix B element.

8. The HWA matrix-solve system of claim 1, wherein the fetch-A block includes:
a fetch-A memory address register to send a memory address request of the portion of matrix A; and
a fetch-A memory data register first-in-first-out (FIFO) buffer to store and provide the portion of matrix A.

9. The HWA matrix-solve system of claim 1, wherein the determined value of the matrix X includes at least one of a forward substitution value and a backward substitution value.

10. The HWA matrix-solve system of claim 9, wherein the forward substitution value is determined according to $$X_{pq} = \frac{B_{pq} - \sum_{i=0}^{p-1} A_{pi} X_{iq}}{A_{pp}}.$$

11. The HWA matrix-solve system of claim 9, wherein the forward substitution value is determined according to $$X_{pq} = \frac{B_{pq} - \sum_{i=p+1}^{M-1} A_{pi} X_{iq}}{A_{pp}}.$$

12. The HWA matrix-solve system of claim 1, further comprising a plurality of column compute blocks, each of the plurality of column compute blocks including a matrix column computation block.

13. A hardware accelerated (HWA) matrix-solve method comprising:
providing a portion of a matrix A at a fetch-A block to a matrix column computation block; and generating a new element of matrix X at the matrix column computation block, including:
  fetching at least one value of a matrix X at an X-buffer block within the matrix column computation block;
  generating a plurality of partial dot products at a within-column parallel compute block within the matrix column computation block, the plurality of partial dot products determined based on the portion of the matrix A and on the at least one value of the matrix X; and
  generating the new element of matrix X at a serial compute block within the matrix column computation block, the new element of matrix X determined based on the plurality of partial dot products.

14. The HWA matrix-solve method of claim 13, further including:
  fetching a matrix B element at a fetch-B block within the matrix column computation block;
  sending the matrix B element from the fetch-B block to the parallel compute block;
  generating a negated matrix B element at a negation block within the parallel compute block; and
  generating a matrix-solve difference value at the serial compute block, the matrix-solve difference value based on a sum of the negated matrix B element and the plurality of partial dot products.

15. The HWA matrix-solve method of claim 14, further including receiving a matrix A inverse from the parallel compute block at the serial compute block, wherein generating the new element of matrix X includes multiplying the matrix-solve difference value by the matrix A inverse at a matrix multiplier block within the serial compute block.

16. At least one non-transitory machine-readable storage medium, comprising a plurality of instructions that, responsive to being executed with processor circuitry of a computer-controlled device, cause the computer-controlled device to:
  provide a portion of a matrix A at a fetch-A block to a matrix column computation block; and
  generate a new element of matrix X at the matrix column computation block, including instructions causing the computer controlled device to:
    fetch at least one value of a matrix X at an X-buffer block within the matrix column computation block;
    generate a plurality of partial dot products at a within-column parallel compute block within the matrix column computation block, the plurality of partial dot products determined based on the portion of the matrix A and on the at least one value of the matrix X; and
    generate the new element of matrix X at a serial compute block within the matrix column computation block, the new element of matrix X determined based on the plurality of partial dot products.

17. The machine-readable storage medium of claim 16, the instructions further causing the computer-controlled device to:
  fetch a matrix B element at a fetch-B block within the matrix column computation block;
  send the matrix B element from the fetch-B block to the parallel compute block;
  generate a negated matrix B element at a negation block within the parallel compute block; and
  generate a matrix-solve difference value at the serial compute block, the matrix-solve difference value based on a sum of the negated matrix B element and the plurality of partial dot products.

18. The machine-readable storage medium of claim 17, the instructions further causing the computer-controlled device to receive a matrix A inverse from the parallel compute block at the serial compute block, wherein the instructions causing the computer-controlled device to generate the new element of matrix X includes instructions further causing the computer-controlled device to multiply the matrix-solve difference value by the matrix A inverse at a matrix multiplier block within the serial compute block.

19. The machine-readable storage medium of claim 18, wherein the matrix multiplier block includes a multi-cycle-path multiplier block.

20. The machine-readable storage medium of claim 18, wherein the instructions causing the computer-controlled device to receive a matrix A inverse from the parallel compute block at the serial compute block further include instructions causing the computer-controlled device to:
  retrieve the matrix A inverse at the fetch-A block; and
  send the matrix A inverse from the fetch-A block through the parallel compute block to the serial compute block.

21. The machine-readable storage medium of claim 17, the instructions further causing the computer-controlled device to:
  send a memory address request for the portion of matrix B from a fetch-B memory address register within the fetch-B block; and
  store and provide the portion of matrix B at a fetch-B memory data register FIFO buffer within the fetch-B block.

22. The machine-readable storage medium of claim 16, the instructions further causing the computer-controlled device to:
  send a memory address request for the portion of matrix A from a fetch-A memory address register within the fetch-A block; and
  store and provide the portion of matrix A at a fetch-A memory data register FIFO buffer within the fetch-A block.

23. The machine-readable storage medium of claim 16, wherein the instructions causing the computer-controlled device to determine the value of the matrix X further includes instructions causing the computer-controlled device to determine at least one of a forward substitution value and a backward substitution value.

24. The machine-readable storage medium of claim 23, wherein the forward substitution value is determined according to $$X_{pq} = \frac{B_{pq} - \sum_{i=0}^{p-1} A_{pi} X_{iq}}{A_{pp}}.$$

25. The machine-readable storage medium of claim 23, wherein the forward substitution value is determined according to $$X_{pq} = \frac{B_{pq} - \sum_{i=p+1}^{M-1} A_{pi} X_{iq}}{A_{pp}}.$$

* * * * *